United States Patent
Stern

(10) Patent No.: US 6,591,247 B2
(45) Date of Patent: Jul. 8, 2003

(54) METHOD AND APPARATUS FOR DISTRIBUTING AUDIOVISUAL CONTENT

(75) Inventor: Michael R. Stern, Mill Valley, CA (US)

(73) Assignee: PRN Corporation, San Francisco, CA (US)

(*) Notice: Subject to any disclaimer, the term of this patent is extended or adjusted under 35 U.S.C. 154(b) by 0 days.

(21) Appl. No.: 09/130,998

(22) Filed: Aug. 7, 1998

(65) Prior Publication Data

US 2002/0069113 A1 Jun. 6, 2002

Related U.S. Application Data

(60) Provisional application No. 60/055,708, filed on Aug. 8, 1997.

(51) Int. Cl.[7] .................................................. G06F 17/60
(52) U.S. Cl. ............................. 705/14; 709/223; 707/10
(58) Field of Search ................... 705/14, 1; 709/203; 707/10

(56) References Cited

U.S. PATENT DOCUMENTS

| | | | |
|---|---|---|---|
| 3,947,882 A | 3/1976 | Lightner | 360/92 |
| 4,092,732 A | 5/1978 | Ouchi | 364/900 |
| 4,247,759 A | 1/1981 | Yuris et al. | 235/381 |
| 4,262,302 A | 4/1981 | Sexton | 358/10 |
| 4,300,040 A | 11/1981 | Gould et al. | 235/381 |
| 4,305,131 A | 12/1981 | Best | 364/521 |
| 4,405,984 A | 9/1983 | Siegel et al. | 364/410 |

(List continued on next page.)

FOREIGN PATENT DOCUMENTS

| | | | | |
|---|---|---|---|---|
| EP | 0649121 A2 * | 4/1995 | | G07F/17/16 |
| WO | WO 95/01703 | 1/1995 | | |
| WO | WO 95/17704 | 6/1995 | | |
| WO | WO96/08113 | 3/1996 | | H04N/7/173 |

OTHER PUBLICATIONS

PRN Product Descriptions retrieved on Jun. 9, 2000 from the Internet <URL: http://www.prn.com>.*

(List continued on next page.)

*Primary Examiner*—Tariq R. Hafiz
*Assistant Examiner*—Susanna Meinecke-Diaz
(74) *Attorney, Agent, or Firm*—Pillsbury Winthrop LLP

(57) ABSTRACT

An advertising method and system to disseminate information concerning multiple products includes a database containing the information and provides a perceivable stimulus to a consumer positioned proximate to site, with the site being remotely disposed with respect to the database. To disseminate the information, a set of software modules are employed which implement a set of functionalities intended to provide centralized management, remote distribution, and the stimulus. The stimulus is provided by playback of digitally encoded information which may include a stimulus that is either auditory, visual, olfactory, tactile or any combination thereof. The stimulus may be provided by a dedicated multimedia kiosk which includes a monitor, digital processor having a sound card and an input device, such as a keyboard or a mouse. In addition, the stimulus may be provided using products advertised for sell in the retail store where the consumer is located or in conjunction with a kiosk. The stimulus may be either interactive or non-interactive. For example, an interactive consumer stimulus may be initiated by a consumer scanning a UPC code on a product of interest.

15 Claims, 4 Drawing Sheets

U.S. PATENT DOCUMENTS

| | | | |
|---|---|---|---|
| 4,414,467 A | 11/1983 | Gould et al. | 235/381 |
| 4,490,810 A | 12/1984 | Hon | 364/900 |
| 4,544,920 A | 10/1985 | Hamlin | 340/565 |
| 4,593,376 A | 6/1986 | Volk | 364/900 |
| 4,598,810 A | 7/1986 | Shore et al. | 194/205 |
| 4,616,263 A | 10/1986 | Eichelberger | 358/185 |
| 4,647,989 A | 3/1987 | Geddes | 360/55 |
| 4,654,799 A | 3/1987 | Ogaki et al. | 364/479 |
| 4,660,101 A | 4/1987 | Martin | 358/342 |
| 4,667,802 A | 5/1987 | Verduin et al. | 194/217 |
| 4,672,554 A | 6/1987 | Ogaki | 364/479 |
| 4,674,055 A | 6/1987 | Ogaki et al. | 364/479 |
| 4,685,001 A | 8/1987 | Martin | 358/342 |
| 4,685,003 A | 8/1987 | Westland | 360/14.1 |
| 4,688,105 A | 8/1987 | Bloch et al. | 358/335 |
| 4,703,465 A | 10/1987 | Parker | 369/30 |
| 4,717,971 A | 1/1988 | Sawyer | 358/342 |
| 4,766,581 A | 8/1988 | Korn et al. | 369/30 |
| 4,782,401 A | 11/1988 | Faerber et al. | 358/335 |
| 4,800,331 A | 1/1989 | Vesce et al. | 323/277 |
| 4,807,224 A | 2/1989 | Naron et al. | 370/94 |
| 4,827,347 A | 5/1989 | Bell | 358/224 |
| 4,882,724 A * | 11/1989 | Vel et al. | 705/14 |
| 4,896,791 A | 1/1990 | Smith | 221/7 |
| 4,899,331 A | 2/1990 | Masaki et al. | 369/32 |
| 4,905,077 A | 2/1990 | Ishii | 358/22 |
| 4,905,094 A | 2/1990 | Pocock et al. | 358/342 |
| 4,937,807 A | 6/1990 | Weitz et al. | 369/85 |
| 4,949,322 A | 8/1990 | Kimura et al. | 369/32 |
| 4,962,466 A * | 10/1990 | Revesz et al. | 705/14 |
| 4,964,004 A | 10/1990 | Barker | 360/14.1 |
| 4,984,098 A | 1/1991 | Buntsis | 360/12 |
| 5,051,973 A | 9/1991 | Shiba et al. | 369/36 |
| 5,084,768 A | 1/1992 | Stern et al. | 358/342 |
| 5,105,402 A | 4/1992 | Ishii et al. | 369/43 |
| 5,237,157 A * | 8/1993 | Kaplan | 235/375 |
| 5,263,199 A | 11/1993 | Barnes et al. | 455/344 |
| 5,341,476 A | 8/1994 | Lowell | 395/200 |
| 5,392,066 A | 2/1995 | Fisher et al. | 348/8 |
| 5,457,376 A | 10/1995 | Chong et al. | 320/2 |
| 5,459,702 A | 10/1995 | Greenspan | 369/25 |
| 5,467,326 A | 11/1995 | Miyashita et al. | 369/30 |
| 5,483,506 A | 1/1996 | Yoshioka et al. | 369/7 |
| 5,504,675 A | 4/1996 | Cragun et al. | 705/14 |
| 5,526,482 A | 6/1996 | Stallmo et al. | 395/182.04 |
| 5,532,680 A | 7/1996 | Ousborne | 340/567 |
| 5,557,721 A | 9/1996 | Fite et al. | 705/14 |
| 5,568,612 A | 10/1996 | Barrett et al. | 395/200.01 |
| 5,583,501 A | 12/1996 | Henrion et al. | 341/118 |
| 5,612,730 A | 3/1997 | Lewis | 348/8 |
| 5,617,565 A | 4/1997 | Augenbraun et al. | 395/604 |
| 5,629,867 A | 5/1997 | Goldman | 364/514 |
| 5,634,022 A | 5/1997 | Crouse et al. | 395/704 |
| 5,640,193 A | 6/1997 | Wellner | 348/7 |
| 5,640,453 A | 6/1997 | Schuchman et al. | 380/10 |
| 5,642,171 A | 6/1997 | Baumgartner et al. | 348/515 |
| 5,642,484 A | 6/1997 | Harrison, III et al. | 705/14 |
| 5,708,845 A | 1/1998 | Wistendahl et al. | 395/806 |
| 5,724,424 A | 3/1998 | Gifford | 380/24 |
| 5,727,048 A * | 3/1998 | Hiroshima et al. | 379/93.12 |
| 5,758,257 A * | 5/1998 | Herz et al. | 348/906 |
| 5,764,901 A | 6/1998 | Skarbo et al. | 395/200.34 |
| 5,784,527 A | 7/1998 | Ort | 386/111 |
| 5,815,471 A | 9/1998 | Mince et al. | 369/30 |
| 5,918,213 A * | 6/1999 | Bernard et al. | 705/26 |
| 5,920,865 A * | 7/1999 | Ariga | 707/10 |
| 5,931,906 A * | 8/1999 | Fidelibus et al. | 709/217 |
| 5,949,411 A * | 9/1999 | Doerr et al. | 345/327 |
| 5,963,916 A * | 10/1999 | Kaplan | 705/26 |
| 5,996,000 A * | 11/1999 | Shuster | 709/201 |
| 6,366,914 B1 * | 4/2002 | Stern | 707/10 |

OTHER PUBLICATIONS

"Handleman Company Announces Plans to Bring Internet Music Purchasing to Its Mass Merchant Customers Through Alliance with Intouch Group, Inc." PR Newswire, Feb. 25, 1997.*

"Topic of Discussion at Multimedia Expo East '94." Computer Retail Week, vol. 47, No. 464, Jun. 6, 1994.*

PointCast Press Release; "Broadcast Capability For Corporate Intranet" Dec. 22, 1998, pp. 1–8.

Collins,D.J.; "Using Bar Code, Why It's Taking Over"; Data Capture Institute, second edition, Feb. 29, 1991.

Tanenbaum, A.S; "Computer Networks", Third Edition; pp. 722–761; Oct. 13, 1998.

* cited by examiner

METHOD AND APPARATUS FOR DISTRIBUTING AUDIOVISUAL CONTENT

CROSS-REFERENCE TO RELATED APPLICATIONS

This invention claims priority from a provisional application entitled "DIGITAL DEPARTMENT SYSTEM" (U.S. Provisional Application Number 60/055,708), filed Aug. 8, 1997, having M. Stern as inventor, and having as assignee PICS Previews, Inc., the assignee of the present invention. This provisional is incorporated herein by reference, in its entirety and for all purposes.

This application is also related to concurrently filed and commonly assigned patent application Ser. No. 09/130,900 entitled "DIGITAL DEPARTMENT SYSTEM," having Michael Stern listed as inventor; and to concurrently filed and commonly assigned patent application Ser. No. 09/130,899 entitled "AN AUDIOVISUAL CONTENT DISTRIBUTION SYSTEM," having Michael Stern listed as inventor; and to concurrently filed and commonly assigned patent application Ser. No. 09/131,286 entitled "A RECONFIGURABLE AUDIOVISUAL PREVIEWING SYSTEM AND METHOD OF OPERATION," having Michael Stern listed as inventor. Each of the above referenced applications are assigned to PICS Previews, Inc., the assignee of the present invention, and each of the above referenced applications are hereby incorporated by reference, in their entirety and for all purposes.

BACKGROUND OF THE INVENTION

The present invention relates generally to advertising systems in which retail advertisements may be created at a centralized situs and distributed to one or more remote locations. Specifically, the present invention is directed to an advertisement method and system suited for advertising to consumers in retail stores.

Television and radio media have been recognized as a powerful and efficient medium for broadcasting advertising and entertainment content to a large, widely dispersed audience, e.g., potentially millions of television viewers. To that end, these media have traditionally garnered a major share of advertising budgets amounting to billions of dollars per year. The money directed toward advertising has increased the amount of advertisements to which television and radio audiences are exposed, resulting in sensory overload or audience resentment. The former results in the advertisement losing its impact and the latter resulting having a negative impact on the product being advertised. For example, many television audiences ignore commercials entirely by changing from one channel to another via their hand-held television remote control. It is estimated that one-fifth of all television viewers pay no attention to television commercials. Further, recent technological changes have drastically reduced the size of the television and radio audiences. Many individuals who would otherwise be in the television and radio audiences are preoccupied with cable television, video cassette recorders, compact diskette players and the Internet.

Finally, advertising through television and radio media frustrates attempts to taylor commercials to specific target audiences in a cost efficient manner. Due to the large undifferentiated audiences, advertisements over these media often reach individuals having little or no interest in the products being advertised or may not appreciate the message of the advertisement. Moreover, the cost of duplicating advertisements for a single product to target different audiences is usually not economically feasible. As a result, advertising dollars are ineffectively spent on messages that may reach the wrong audiences under the wrong circumstances.

To overcome these problems with advertising through television and radio media, several systems have been recently developed for displaying advertisements on television monitors positioned throughout a store, referred to herein as point-of-purchase advertisement systems. In-store advertising of this nature is particularly advantageous because the sight and action of television is combined with the impact of point-of-purchase to deliver a powerful and timely message in the retail store where buying decisions are being made.

For example, an advertising system known as InfoChannel produced by Scala, Inc., 1801 Robert Fulton Drive, Suite 400, Reston, Va. 22091, allows advertisement pages with text and illustrations to be transmitted from a control center to a network of television sets. Infochannel can also connect several television networks located in different buildings by using computers and modems which permit the advertisements to be sent to the remote locations over standard telephone lines. Control software known as InfoNet permits different advertisements to be sent to different locations automatically. Finally, InfoChannel includes means for broadcasting the advertisements to remote locations by inserting the advertisement data into a television channel's free space in such a manner that the advertising data can be extracted from the television signal by the computers at each location. In this manner, broadcasts via satellite to thousands of locations can occur simultaneously.

Another advertising system known as AdVision produced by Video Arts Systems & Technology, Inc. of Sea Girt Village Center, 2175 Hwy. 35, #8-R, Sea Girt, N.J. 08750 delivers advertisements and electronic bulletin-board type presentations by means of a production workstation, and a plurality of receiving player systems positioned at remote locations. The advertisements are transmitted from the production workstation to the receiving player systems at the remote locations over cable television.

Similar to InfoChannel, a system known as Videofax produced by The Videofax Company, 60 Madison Avenue, Suite 903, New York, N.Y. 10010, enables still video images to be transmitted across standard telephone networks or corporate data networks to remote receiver systems, which then display the video images.

Another advertising system known as NewMedia produced by NewMedia Corporation of 201 North Union Street, Alexandria, Va. 22314 employs satellites or modems and telephone lines, to transmit advertisements from a digital studio to remote locations for display by computer or television monitors. A communications manager controls the file server of the data television network with appropriate data compression, inscription, forward error correction, format conversion and addressing to increase reception reliability.

U.S. Pat. No. 5,392,066 to Fisher et al. discloses an in-store advertising system for displaying advertisements that involves preparing graphical art from the actual products or from flat art, for each advertised product. Each frame is stored in computer memory as a digital graphics file. As desired, pricing and advertising copies are added as overlays to the digital art of each frame. Control data is defined for each frame indicating its destination location(s) and the run time for each destination location. The digital graphic files containing a digital frame and the respective control data for each frame are then loaded into an uplink control computer. The control data is analyzed by the uplink computer to compute an adlist which lists the digital frames and their respective destination. The uplink control computer is interfaced to a satellite addressable network control system (ANCS) to unmute the desired satellite receiver(s) at the remote location(s), based upon a predefined transmission script. The uplink computer then transmits the respective graphic files, control data and adlist via a satellite transmitter to a commercial broadcasting satellite. The remote receivers display the graphic data based on the code data.

U.S. Pat. No. 5,724,424 to Gifford discloses a system for the purchasing of goods or information over a computer network that includes merchant computers on a network to maintain databases of digital advertisements that are accessed by buyer computers. In response to user inquiries, buyer computers retrieve and display digital advertisements from merchant computers. A digital advertisement can include a program that is interpreted by a buyer's computer. The buyer computers include a means for a user to purchase the product described by a digital advertisement. If a user has not specified a means of payment at the time of purchase, it can be requested after a purchase transaction is initiated. A network payment system performs payment order authorization in a network with untrusted switching, transmission, and host components. Payment orders are backed by accounts in an external financial system network, and the payment system obtains account authorizations from this external network in real-time. Payment orders are signed with authenticators that can be based on any combination of a secret function of the payment order parameters, a single-use transaction identifier, or a specified network address.

While the prior art point-of-purchase advertisement systems overcome many of the drawbacks associated with television and radio advertisements, the advertisement message provided by these systems are often lost among the myriad of static and print-oriented media proximate to the point of purchase advertisement system, e.g., signage and packing labels. As a result, the message of the advertisements are often lost in the clutter and the consumer often fails to either perceive the message of the advertisement or associate the message with the product being advertised.

What is needed, therefore, is a method and system for advertising products to consumers while the consumer is disposed proximate to the product being advertised while ensuring that the consumer is ready to perceive the message content of the advertisement.

SUMMARY OF THE INVENTION

An advertising method and system to disseminate information concerning multiple products includes a database containing the information and provides a perceivable stimulus to a consumer positioned proximate to site, with the site being remotely disposed with respect to the database. To disseminate the information, a set of software modules are employed which implement a set of functionalities intended to provide centralized management, remote distribution, and the stimulus. The stimulus is provided by playback of digitally encoded information which may include a stimulus that is either auditory, visual, olfactory, tactile or any combination thereof. The stimulus may be provided by a dedicated multimedia kiosk which includes a monitor, digital processor having a sound card and an input device, such as a keyboard or a mouse. In addition, the stimulus may be provided using products advertised for sell in the retail store where the consumer is located or in conjunction with a kiosk. The stimulus may be either interactive or non-interactive. For example, an interactive consumer stimulus may be initiated by a consumer scanning a UPC code on a product on interest.

Preferably, all the sites in a store are connected to a network and are able to store and present digital content both non-interactively and interactively on a per product basis. The network is connected to a centralized store server with the content for each of the store sites being stored therein in a database. The store server distributes advertisements to each of the store sites based upon a plurality of parameters, one of which is the proximity of the site to a product being advertised thereon. Content intended for playback in the retail store is received from a centralized database remotely disposed with respect to the store server. Dissemination of information concerning products are achieved based upon factors such as the products present in a store, as well as the timeliness of the information. Preferably, the information from the centralized database is disseminated via a satellite based network to the designated stores. The store server of each store, upon receiving the information, manages the process of distributing the same within the store. The store server acknowledges receipt of the information from the centralized database through a back-channel network which is then used to update central database. Additionally, statistics and logs which reflect consumer use patterns and operating conditions are gathered and returned to the centralized database. Critical error conditions are monitored throughout the information dissemination process and are conveyed the store server through a standard SNMP trapping mechanism which can be monitored for each installation.

DESCRIPTION OF THE PREFERRED EMBODIMENT

Figure 1:
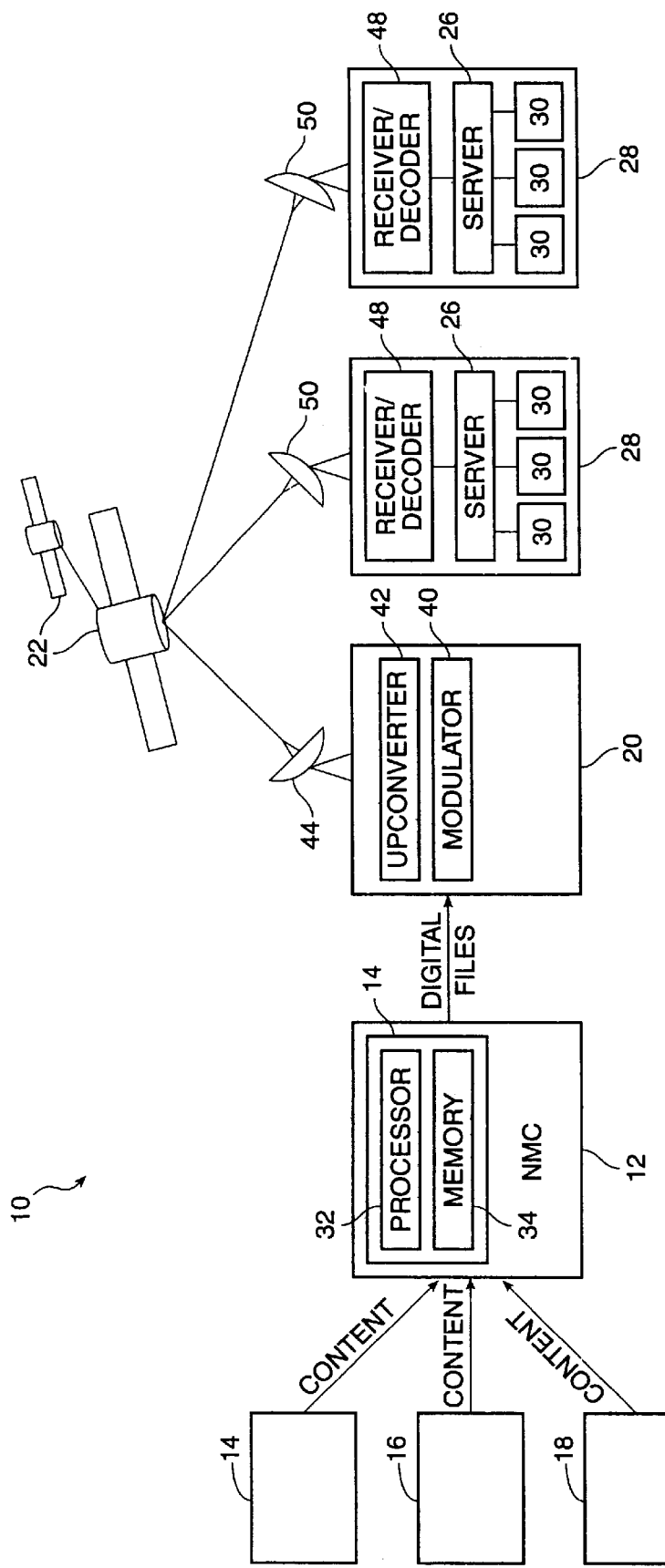
FIG. 1 is a simplified plan view of a system for disseminating information in accordance with the present invention.

Referring to FIG. 1, an advertising system 10 is shown as including a network management center 12 (NMC 12) which has one or more is a computer systems 14 at least one of which is adapted to receive information in a variety of formats, e.g., audio information 16, video information 18 and literature 20. If not already in digitized form, the NMC 10 is adapted to digitize the aforementioned information and maintain a database of the same in variety of file formats. In data communication with the NMC 12 is a network operating center 22 (NOC 22) The NOC 22 is in selective data communication with one or more satellites 24. The satellites are, in turn, in selective data communication with one or more servers 26 associated with one or more retail stores 28. The server 26 is in data communication with one or more sites 30 via a network employing one of a plurality of information distribution protocols, e.g., the Internet protocol (IP) multicasting, switched multimegabit data service (SMDS), WAN, Internet group management protocol (IGMP), Starburst™ multicasting (Multicast FTP™), or Hughes' DirecPC™ are all possible. However, satellite distribution is but one way of distributing information. Other methods, such as wide area networks (WAN), Internet connections (via, for example, an independent service provider (ISP)), or other electronic distribution medium could be employed in place of the satellite distribution system.

In an exemplary embodiment, the NOC 20 includes an uplink control computer 36 and a conventional addressable network controller system (ANCS) 38 having outputs which feed to a modulator 40. The modulator 40 converts the baseband signal into a radio frequency subcarrier. These subcarriers are then fed to an upconverter 42 which converts the signals to a high frequency microwave signal to be transmitted to satellite 22 via an antenna 44 which is coupled to the upconverter 42. An power amplifier (not shown) may be connected to receive the microwave signal and increase its power to 200 watts or more before transmission to the satellite 40. The computer system 14, employed by the NMC 12, may include a 32-bit operating system using a windowing environment (e.g., Windows™ or X-Windows operating system) including a processor 32 in data communication with a memory 34. The processor is adapted to execute system software, which is a computer program stored in a memory 34. Any type of memory device may be employed, such as a hard disk drive, a floppy disk drive, a card rack or a combination thereof.

The satellites 22 are, in turn, in selective data communication with one or more servers 26 associated with one or more retail stores 28. To that end, each retail store 28 includes a receiver/decoder 48 which is connected to an antenna 50 to sense and decoded information on the microwave signal. The server 26 is in data communication with the receiver/decoder and connected to one or more sites 30 via a network. In this fashion, information received from the satellite 22 may be distributed to one or more of the sites 30 in one or more stores 28.

Figure 2:
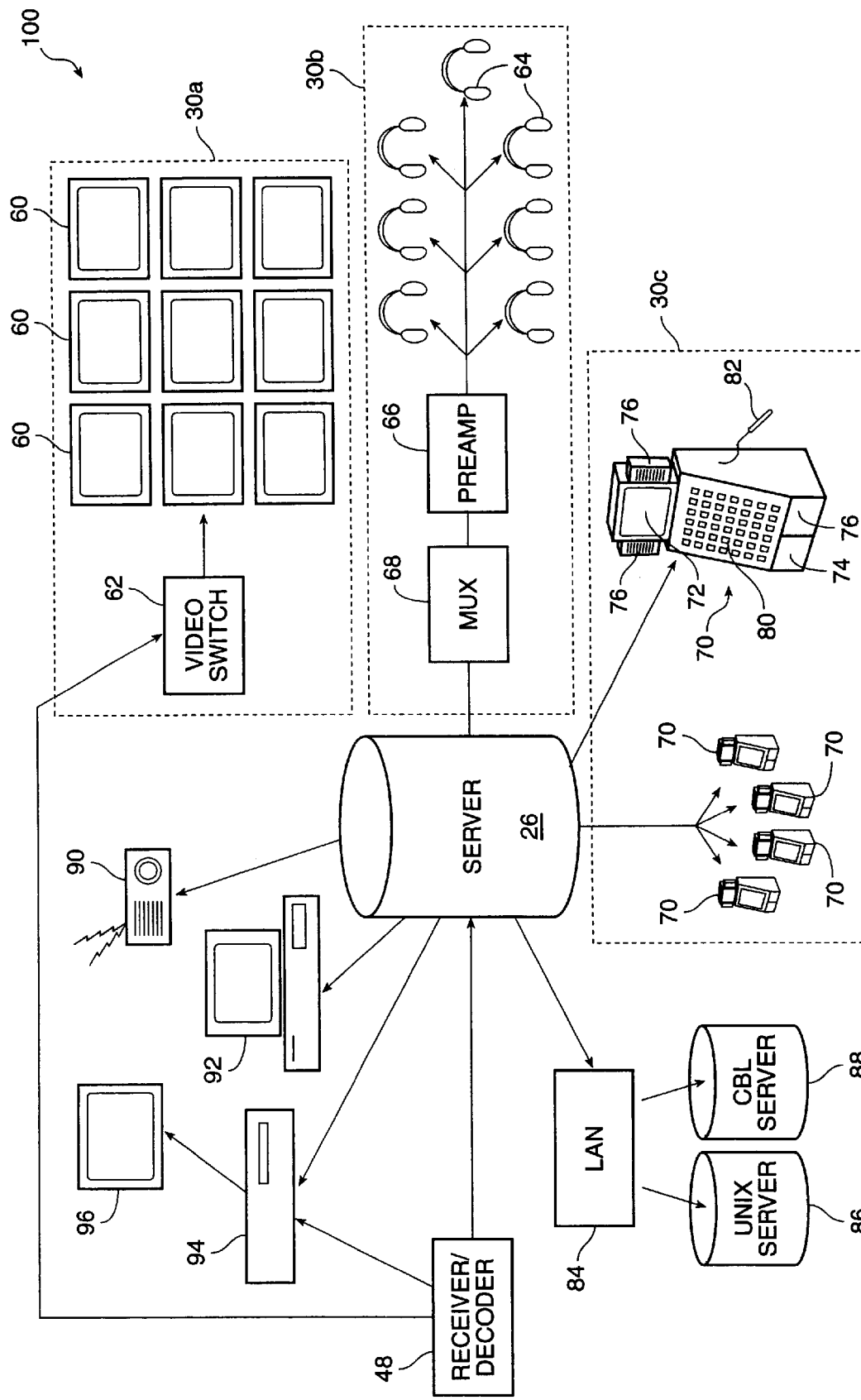
FIG. 2 is a detailed view of a computer network shown in FIG. 1 and positioned at a retail store.

Referring to FIG. 2, each of the sites 30 connected to an exemplary network in a store 28 may include one or more of many differing input/output devices. For example, site 30a includes a one or more television sets 60 which may be displayed for retail sale in the store 28, typically referred to as a "wall of eyes". Site 30b includes one or more speakers, in this case headsets 64 connected to a the server through a preamplifier 66 and a multiplexer 68. In this fashion, audio information, e.g., music, may be perceived by multiple consumers in the store 28. Employing the multiplexer allows providing different channels so that multiple songs may be heard through multiple headsets 64 contemporaneously. Site 30c includes one or more audio/video kiosks 70 which typically include a monitor 72, a memory 74, and speakers 76 all of which are in data communication with a processor 78. Also included in the kiosk 70 is a data entry device such as a keyboard 80 and/or an optical sensor 82, also known as a light pen. Site 30d includes an Internet connection via a local area network 84 (LAN 84) which may accommodate on-line Internet commerce access. The LAN 84 may include a UNIX server 86 and/or a CBL server 88, or any other server known in the art.

In addition to sites 30a–30d, mentioned above, server 26 may be connected to other devices in the store 28, including a centralized musical system 90 as well as a desk top personal computer system 92 and a video cassette recorder 94 connected to a television monitor 96. however, it should be realized that the receiver decoder connected to the server 26 may also be connected directly to some of the aforementioned components, e.g., the VCR 94 to receive video streams directly from the satellite 22. The network which connects the server 26 to the sites 30 effectuates file information transfer therebetween using convention protocols, such as the TCP/IP and FTP may be provided to one or more consumers at the site 30b.

Figure 3:
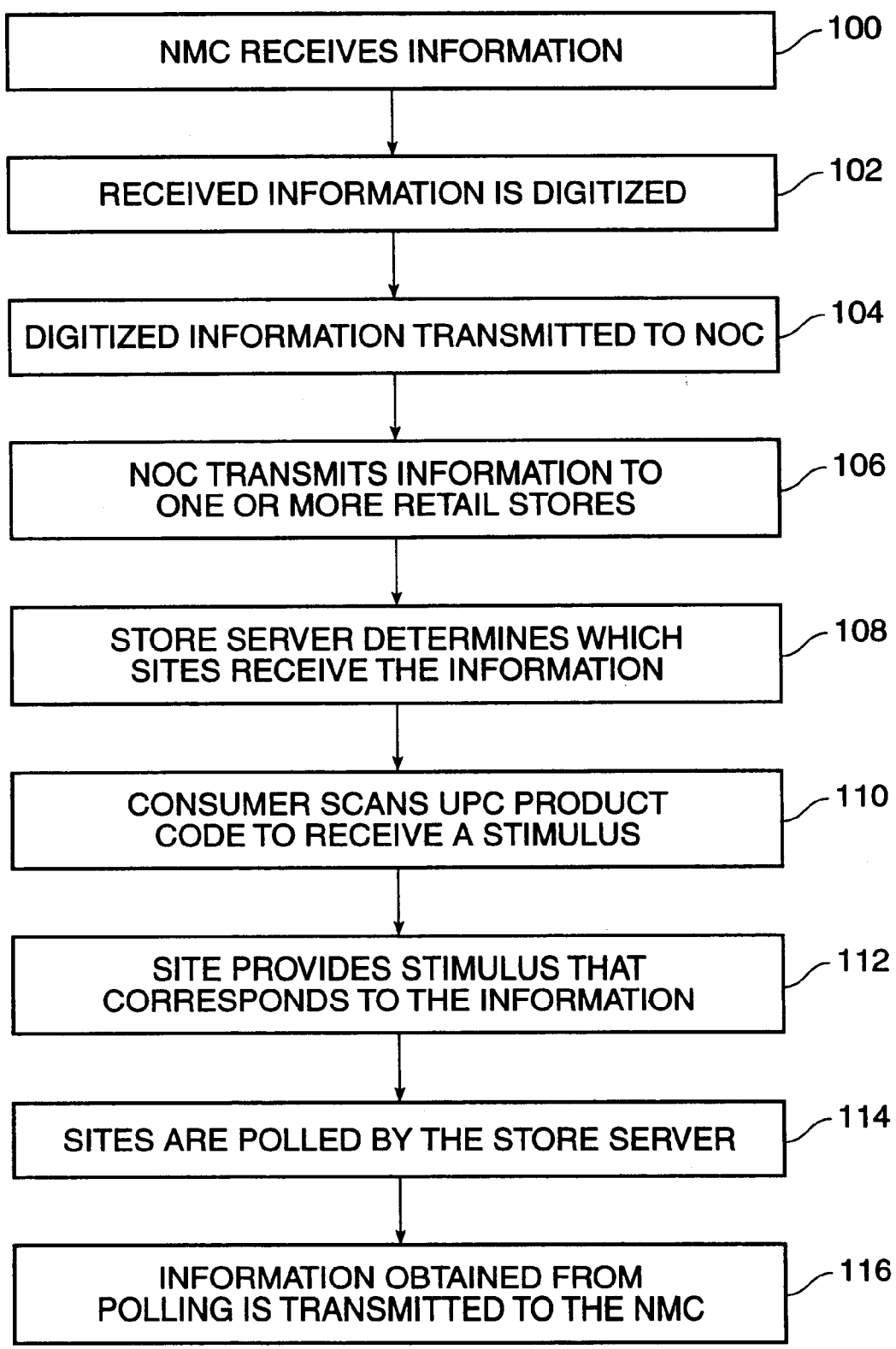
FIG. 3 is a flow diagram showing how information is disseminated.

Referring to FIGS. 1 and 3, in operation the NMC 12 receives information, as step 100, from various source and in various formats, e.g., from publicly available or privately available information sources (CDs, other recordings, videos, and other sources) for distribution. Examples of the file formats include, but are not limited to a raster file format, such as Windows Bitmap (BMP), CompuServe GIF (GIF), Tagged Image File Format (TIFF), Joint Photographic Experts Group (JPEG or JPG), Device Independent Bitmap (DIB), Targa (TGA) or PCX, as well as a hybrid Formats, such as Hypertext Markup Language (HTML), Adobe Portable Document Format (PDF), Windows Metafile (WMF), Postscript (PS, EPS). If desired, document file may have a text format, such as, ASCII text (TXT), Rich Text Format (RTF), Microsoft Word (DOC) and the like, as well as a video stream, such as Motion Picture Experts Group (MPEG) Microsoft Video for Windows (AVI) Quicktime (MOV), an audio file or combination thereof. Also, a vector-based file such as Drawing Web Format (DWF), Autodesk AutoCAD (DWG), Drawing Exchange Format (DXF), Simple Vector Format (SVF), Bentley Microstation (DGN, CEL), Adobe Illustrator (AI), Corel Draw (CMX), Microsoft Powerpoint (PPT), HPGL and HPCL/2 may be stored thereon. The NMC then performs the necessary operations to digitize the information, at step 102, if not already digitized. It should be understood, however, that information not requiring digitization may be distributed employing analog techniques. The digitized information in then transmitted to the NOC 20, at step 104 which communicates the digitized information to commercial sales outlet 28 via satellite 22, at step 106. The server 26 then determines which sites 30 are to have the digitized information available to it, at step 108.

Typically, the sites 30 receive digital information corresponding to products proximate thereto. For example, with respect to site 30c, the digital information made available thereto is present in memory 76. The information contained therein is operated on by the processor 74 to provide a sensory event/stimulus to a consumer proximate to a kiosk 70. The processor 74 may be initiated in one of several manners to provide the stimulus. In one manner, a barker routine may periodically run which provides either an audio or visual stimuli or both to obtain the attention of a consumer proximate to the kiosk 70. In this manner, a consumer may be made aware of the information available by the kiosk. Should a consumer desire to obtain additional information about a product, the light sensor 82 would be employed to scan a UPC code on the product, at step 110. This would result in a description of the product being displayed on the monitor 72 which may be accompanied by an auditory description of the same on the speakers 76, at step 112. In a similar fashion, a barker routine may be employed to create visual display on the television monitors 60 associated with said 30a which could describe the functions of the kiosk 70. Audio/video kiosks 70 allow users to preview audio and video samples. Examples of such interactive kiosks 70 are described in commonly assigned U.S. patent applications Ser. No. 08/183,596, filed Jan. 19, 1994 and entitled "METHOD AND APPARATUS FOR PREVIEWING PRODUCT INFORMATION AND EFFECTING a TRANSACTION"; No. 08/694,694, filed Aug. 8, 1996 and entitled "METHOD AND System FOR PREVIEWING AUDIO SELECTIONS"; Ser. No. 08/771,605, filed Dec. 20, 1996 and entitled "METHOD AND APPARATUS FOR SIMULTANEOUS PLAYING VIDEO AND AUDIO DATA"; and U.S. Provisional Patent Application No. 60/013,693, filed Mar. 19, 1996 and entitled "METHOD AND APPARATUS FOR PREVIEWING AUDIO SELECTIONS", each of which are hereby incorporated by reference in their entirety. Another example of such systems is described in commonly assigned U.S. Pat. No. 5,084,768 entitled "METHOD AND APPARATUS FOR PREVIEWING RECORDED INFORMATION," issued to M. R. Stern and S. M. Stern, hereby incorporated by reference in its entirety.

At a predetermined time, the sites 30 are polled by the server 26, at step 114 to gather information concerning the products for which the sites were queried, as well as the type of digital information available to the sites 30. This facilitates compilation of statistical data concerning consumer trends and preferences for different products in the store 28. In addition, the advertisements for the products may be kept contemporary by identifying the digital information with a date code. The statistical data compiled by the server 26 is then transmitted to the NMC 12 for analysis, at step 116.

An important consideration with position the sites 30 throughout a retail store 28 is to ensure that the same are proximate to a product for which the site 30 is to provided information. In this fashion, not only will consumers be attracted to use the system, but this also facilitates use of the short term memory to associate a particular brand name of a product from the others which are disposed adjacent thereto with the information provided by the site 30. This may prove important when piggybacking advertisements. For example, were a consumer to desire more information about a compact diskette (CD), the consumer would scan the UPC code on the product. Before receiving information about the CD information, or advertisements, concerning one or more additional products may be provided, e.g., a battery. The battery information would precede the information provided that concerns the product for which the UPC code was scanned. The entire length of time of the information provided concerning the scanned product and the position of the site 30 would be chosen so that the total time to for a consumer to walk from the site 30 to the battery section of the store would maximize recall of the battery information.

It was recognized that short-term memory is a temporary form of memory that lasts many seconds and that the same has limited capacity. This results in information placed in the short-term memory becoming deactivated (forgotten) very rapidly. By strategically placing the sites 30 proximate to the products for which information is provided thereby, association with the product on the shelf with the information is maximized. In this fashion, a consumer is more likely to chose a brand name of the product for which the site 30 provided information among the plurality of brand names of products disposed adjacent thereto.

Operation of the system 10 is controlled using a computer program product that is executed the processor 32 and server 28. The computer program code can be written in any conventional computer readable programming language, for example, 68000 assembly language, C, C++, Pascal, Fortran or others. Suitable program code is entered into a single file, or multiple files, using a conventional text editor, and stored or embodied in a computer usable medium, such as the memory 34, and the server 26. If the entered code text is in a high level language, the code is compiled, and the resultant compiler code is then linked with an object code of pre-compiled Windows™ library routines. To execute the linked, compiled object code the system user invokes the object code, causing the processor 32 to load the code in the memory 34. The processor 32 then reads and executes the code to perform the tasks identified in the program.

Figure 4:
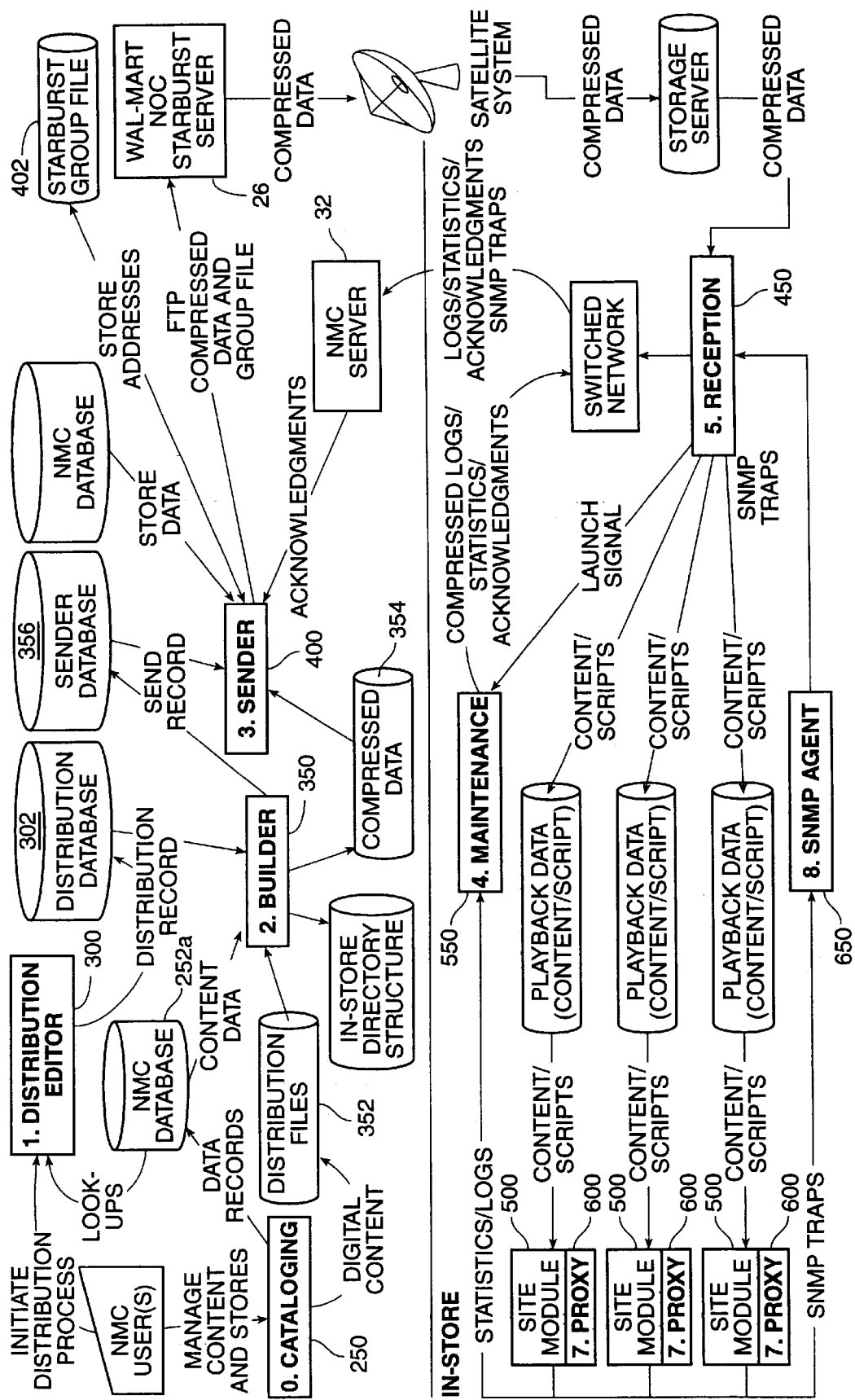
FIG. 4 is a simplified data flow chart in accordance with the present invention.

FIG. 4 shows an illustrative block diagram of the hierarchical control structure of system control software 200. The control software 200 is divided into nine modules which communicate through either database records, files on disk, or through IP messages. the nine modules are as follows: a cataloging module 250, a distribution editor module 300, a builder module 350, a sender module 400, a reception module 450, a site module 500, a maintenance module 550, a proxy module 600 and an SNMP agent module 650.

The cataloging module 250 includes databases 252a and 252b associated with the NMC 12 and application software to operate the same. The database 252a and 252b contain tables of information. Representative tables tblUPCMaster, tblGroups, tblUPCGroups, tblPersons, tblVideoMaterials tblAudioMaterials and such as NMC.tbl_Groups.Group_Names. The tables tblVideoMaterials and tblAudioMaterials contain information concerning the advertisements, hereinafter referred to as advertisement information. The table tblUPCMaster contains information concerning UPC codes and products corresponding thereto. The tables tblGroups and tblUPCGroups contain information concerning the products associated with each store, hereinafter referred to as inventory information. The advertisement information is associated with various products, and the inventory information identifies the products associated with each of the retail stores 28. For example, the table tblGroups may include information concerning stores 28 which are to receive advertisement information on a common date, and the table tblUPCGroups may include information concerning stores 28 which stock common products. Associated with the advertisement information and the inventory information are date ranges which indicate the time period for which this information is valid. In this fashion, the accuracy of the inventory information associated with a given retail store 28 is controlled, along with the applicability of the advertisement information corresponding to the products contained therein. In addition to the aforementioned tables of information, the databases 252a and 252b include control information in the fields of script table, NMC.Scripts.Script_ID. The script table comprises of scripts that define the operations of the sites 30, including the order and type of stimulus to be provided thereby.

The distribution editor module 300 is responsible for initiating the distribution of the advertisement and control information to the retail store 28 and comprises of a database 302 and a user interface (not shown) for creating and viewing distribution tables in the database 302 which contain records to be disseminated to the retail store 28. Specifically, the distribution editor module 300 performs lookup routines on NMC.tbl_Groups.Group_Names NMC.Scripts.Script_ID fields Although the data may be accessed employing and database program, it is preferred to employ a Borland Database Engine and an Access ODBC driver (not shown). To generate distribution tables, a target group name from the 'Groups' table is identified. Stores 28 within the target group and content assigned to that group will receive information therefrom. In addition, a date identifying a delay in distribution will be included, with no date indicating immediate transmission the records. Other parameters may also be included in the distribution tables, such as a date range from which to select content to be distributed and/or removed from the distribution table, and a script definition identifier for the sites 30. Upon creation of the records in the distribution tables, the builder module 350 commences the functions associated therewith.

The builder module 350 is responsible for creating distribution files 352 from based upon parameter present in the distribution table of the distribution database 302 which are ultimately sent to each store 28. To that end, the builder module 350 analyzes of the NMC database according to parameters present in the distribution table to determine the advertisement and control information to be included in the distribution files 304. If necessary the builder module also generates scripts. The distribution files, along with any additional scripts generated by the builder module, are compressed into a single file for distribution to multiple stores, creating compressed data 354.

More specifically, the distribution table is periodically scanned for new records by the builder module 350. Upon sensing a new record, the builder module 350 creates a set of distribution files 352. The set of distribution files 352 is created by performing a relational join between the 'tblUPC-Master' and 'tblUPCGroups' tables and querying for all information identifiers (product UPC code and corresponding advertisement information) that match the group and date range specified in the 'distribution' table creating a set of identifiers. The set of identifiers is referred to as the 'pending distribution set' and is copied into generated table called DSet_nn, where nn is the associated distribution identifier from the 'distribution' table. The generated DSet_nn table is a record of all the information that is to be included in the distribution files according to the user parameters stored in the records of the 'distribution' table. For each store 28 in the targeted group, the pending distribution set table is compared to the store 28's current distribution set table (which is held in storeupdate.person.distribution_set_filename) and a result difference set will be generated. The difference set represents the differences between the current and pending distribution sets and will be copied into a temporary table called DiffSet. The DiffSet file is typically identical for all stores 28 in a group, excepting the situation where a store 28 has been recently added or moved to a group and has a different current distribution set when compare to the remaining stores 28 in the group. In this case, a separate difference set will be created for each newly added store in the group and the file name will reflect the store's identifier.

The builder module 350 then uses the information in the difference table, to search for and compile all the binary content files associated into a temporary directory structure that will mirror the in-store directory structure. The distribution files 352 are stored at the NMC 12 in temporary directory and file structures that mirror similar the directory and file structures on the sites 30 which are to receive the distribution files 352.

Also the difference table information is used to create all necessary files used for textual information. The textual script files are in the Windows .ini file format for each script definition. These files include UPC.INI—where UPC is the UPC code of the CD title. Each script file contains all the information employed by a particular site 30 to execute predefined functions associated therewith. The information includes advertising information such as the names and paths of video files, audio files, and graphic files, control information such as order and sequence the aforementioned files, as well as textual data to be displayed on a monitor at the site 30, provided one is present. Examples of script file formats are as follows:
{BUMPEREXCLUSION}
For every record <R> in tblBumperExclusion where tblBumperExclusion ScriptID=ScriptID
1=<R1>
2=<R2>
x=<Rx>

{<R>}
BV=<R.Bumper_upc>
EVx=<R.Title_upc>
{LCDTEXT}
For every record <R> in tblLcdText where tblLcdText.ScriptID=ScriptID
1=<R1>
2=<R2>
x=<Rx>
{<R>}
1=<R.lcd_text_line1>
2=<R.lcd_text_line2>
{SETTINGS}
For the single record <R> in tblAudioSettings where tblAudioSettings.ScriptID=ScriptID
<R.Field Name>=<R.Field Contents>
{ATTRACTSCRIPT}
For every record <R> in tblAttractScript where tblAttractScript.ScriptID=ScriptID
<R.Sequence>=
<R.Command>;INDEX(<R.Content >); <R.Method>; <R.Interruptable>
{SCANSCRIPT}
For every record <R> in tblScanScript where tblScanScript.ScriptID=ScriptID
<R.Sequence>=
<R.Command>;INDEX(<R.Content>); <R.Method>; <R.Interruptable>
In reference to ATTRACTSCRIPT and SCANSCRIPT
INDEX <(R.Content>)
Where <R.Command> is 'PA', 'PB', 'PT' then <R.Content> is a <UPC> code and Index (<UPC>) is the index in the [ATTRACTS], [BUMPERS], [TITLES] section where <UPC> is located.
Where <R.Command> is 'PL' then <R.Content> is the <Text ID> and Index (<TextID >) is the index in the [LCDTEXT] section where <TextID> is located.
{<UPC >} from tblVideoMaterials
For the single record <R> in tblVideoMaterials where tblVideoMaterials.UPC=<UPC>
VF=<R.video_filename>
LCD1=<R.lcd_text_line 1>
LCD2=<R.lcd_text_line2>
For every record <R> in tblVideoText where tblVideoText.UPC=<UPC>
TOx=<R.text>
TCx=<R.left>; <R.top>; <R.width>; <R.height>;
TFx=<R.font_name>
TRx=<R.font_color>
TZx=<R.font_size>
For every record <R> in tblVideoIcon where tblVideoIcon.UPC=<UPC>
GOx=<R.graphic_filename>
GCx=<R.left>; <R.top>;
{<UPC>} from tblBumperMaterials
For the single record <R> in tblBumperMaterials where tblBumperMaterials.UPC <UPC>
VF=<R.video_filename>
LCD1=<R.lcd_text_line1>
LCD2=<R.lcd_text_line2>
TG=<R.Bumperette_LGBitmap_Filename>
IG=<R.Bumperette_SMBitmap_Filename>
For every record <R> in tblVideoText where tblVideoText.UPC=<UPC>
TOx=<R.text>
TCx=<R.left>; <R.top>; <R.width>; <R.height>;
TFx=<R.font_name>

```
TRx=<R.font_color>
TZx=<R.font_size>
For every record <R> in tblVideoIcon where
tblVideoIcon.UPC=<UPC>
GOx=<R.graphic_filename>
GCx=<R.left>;<R.top>;
{<Tx>}
For the single record <R> in tblVideoMaterials,
tblAudioMaterials, tblUPCMaster, thiLinerNotes
VS=tblVideoMaterials.upc
AB=tblUPCMaster.audio_bitmap_filename
CB=tblUPCMaster.cover_bitmap_filename
LN=tblLinerNotes.line1+line2+line3+line4+line5+line6
ASx=tblAudioMaterials.upc+'_'+tblAudioMaterials.seq
{ASx}
for the single record <R> in tblAudioMaterials
AT=tblAudioMaterials.audioFilename
AN=tblAudioMaterials.audioTrackname
AL1=tblAudioMaterials.lcd_text_line1
AL2=tblAudioMaterials.lcd_text_line2
AudioEC Script
{ATTRACTS}
For every record <R> in tblVideoMaterial
where tblVideoMaterial.UPC D_SetX.UPC and
tblVideoMaterial.Destination='AudloEC' and
D_SetX.Type='AM'
1=<R1.UPC>
2=<R2.UPC>
x=<Rx.UPC>
{BUMPERS}
For every record <R> in thlVideoMaterial where
tblVideoMaterial.UPC=D_SetX.UPC and
tblVideoMaterial.Destination='AudjoEC' and
D_SetX.Type='B'
1=<R1.UPC>
2=<R2.UPC>
x=<Rx.UPC>
{TITLES}
For every record <R> in tblAudioMaterial where
tblVideoMaterial.UPC=D_SetX.UPC and
D_SetX.Type='M' and
D_SetX.Featured=true
1=<T1>
2=<T2>
x=<Tx>
VideoEC Script
{ATTRACTS}
For every record <R> in tblVideoMaterial where
tblVideoMaterial.UPC=D_SetX.UPC and
tblVideoMaterial.Destination='VideoEC' and
D_SetX.Type='AM'
1=<R1.UPC>
2=<R2.UPC>
x=<Rx.UPC>
{BUMPERS}
For every record <R> in tblVideoMaterial where
tblVideoMaterial.UPC=D_SetX.UPC and
tblVideoMaterial.Destination='VideoEC' and
D_SetX.Type='B'
1=<R1.UPC>
2=<R2.UPC>
x=<Rx.UPC>
{TITLES}
For every record <R> in tblVideoMaterial where
tblVideoMaterial.UPC=D_SetX.UPC and
D_SetX.Type='HIV'
1=<T1>
2=<T2>
x=<Tx>
WOE Attract Script
{ATTRACTS}
For every record <R> in tblVideoMaterial where
tblVideoMaterial.UPC=D_SetX.UPC and
tblVideoMaterial.Destination='WOE' and
D_SetX.Type='AM'
1=<R1.UPC>
2=<R2.UPC>
x=<Rx.UPC>
{BUMPERS}
For every record <R> in tblVideoMaterial where
tblVideoMaterial.UPC=D_SetX.UPC and
tblVideoMaterial.Destination='WOE' and
D_SetX.Type='B'
1=<R1.UPC>
2=<R2.UPC>
x=<Rx.UPC>
```

Each distribution file 352 in a the .big file format which includes: updated advertising information, in one or more separate compressed (.cab format) file(s) for each site 30 in a store 28. The name of the .big files used in a distribution will have the following format: DsetX_Y.big, where x is the distribution set ID and y is the difference set ID. The names of the .big files are specified in a the Sender.Send.Package_Filename field of the sender database, discussed more fully below and includes timestamp information used by the maintenance module 550. Within each .big file is a set of compressed .CAB files each representing the content that will be destined for a particular location. Each .CAB file specified will contain all the appropriate content compressed so as to mirror the directory structure as it exists in the store 28. These files include the following: AudioEC.cab—which includes audio and video information for products features on a kiosk 70, typically compact diskettes; LP.cab—which includes audio information without corresponding video information which may be included for sites having the headsets 64; VideoEC.cab—for sites 30 having the VCR 94 present; WOE.cab—for video information direction to the television monitors 60, as well as setup.ini—which includes control information detailing at which site to uncompress each file Examples of the setup.ini file formats include [installSectionName]; extractFiles=cabFiles; deleteFiles=deleteFiles; [cabFiles]; LPData.cab=e:; audioEC.Cab=\\cd1\c; videoEC.cab=\\hv1\c; woe.cab=e:;[deleteFiles]; filename1.ext; filename2.ext; and filename3.ext. Finally, the builder module 350 creates a satellite address table-using the group information in the 'distribution' record's 'Group_Name' field, and compiles a list of store addresses both of which are stored in the sender database 356. The name format is s_setxx where xx is the distribution set id. To that end a record is added to a sender database 356 containing the information necessary to enable sender module 400, discussed more fully below, to transmit, via FTP, the .BIG file to the NOC 20 in preparation for satellite transmission.

The sender module 400 includes two threads of computer code: a send thread and a receive thread that transmit the compressed data 354 to the NOC 20 and also to process acknowledgments that return form each store 28 indicating that a distribution had been received. Specifically, the record created by the builder module 350 in the sender database 356 initiates the execution of the computer code associated with the sender module 400. As a result, the sender module creates a group file 402 or address list which contains the Internet protocol (IP) addresses of each store 28 to receive a the compressed data 354. The group file 402 and the compressed data 354 are both sent via FTP to the NOC 20. Acknowledgment that the files were sent is transmitted back to the NMC 12 by the sender module 400, requiring that the same has read/write access to the NMC to store the acknowledgments, because the acknowledgment includes updating one or more of the NMC databases 252a and 252b to reflect the current state of each store 28 when these are received.

Specifically, a record is detected in the Sender.Send table of the sender database 356 which specifies that compressed data 354 is awaiting transmission to one or more stores 28. The sender module 400 associates timestamp information with the compressed data 354, specifying the date upon which the sender module 400 is to create a 'group 402 specifying the DNS qualified IP addresses for each store 28 to receive the same. The timestamp information is a package file having the following format:

ActivationDate_SendID.big where ActivationDate is a mm-dd-yyyy date string and SendID is the send record identifier. For example, for send identifier 99 on July 1st is Jul. 1, 1997_99.big. After transmission, this file would be recognized by the maintenance module 550 to be activated on July $1^{st}$. The send identifier is used in composing the name of the acknowledgment file so they are matched up on acknowledgment when the sender module 400 detects the file has been sent.

The group file 402 is then created for use with the Starburst Multicast server software contained at the NOC 20. However, due to a limitation in the Starburst server software to resolve host names, DNS resolution is typically available to resolve each store's host name before it can be added to the group file 402. The group file 402 includes a list of all the IP addresses for the stores that are to be included in the distribution and is copied along with the compressed data 354 to the NOC 20 via FTP with information stored in a registry (not shown). The format of the group file is as follows:
<Header>
<group_type='address type'>
<max_passes='max passes'>
<address_type='address type'>
for each store.
<IP Addr:'resolved IP address'>
<Client:'resolved IP address'>
<Person:'store name'>
<Phone1:left blank>
<Phone2:left blank>
An exemplay group file 402 is as follows:
[MFTPSERVER GROUP FILE 3.02]
goup_type=Limited
max_asses=1
address_type=Multicast
IP Addr:1.2.3.4
Client:1.2.3.4
Person: Store1
Phone1:
Phone2:
IP Addr:11.22.33.44
Client:11.22.33.44
Person:Store2
Phone1:
Phone2:
IP Addr:.111.222.333.444
Client:111.222.333.444
Person:Store3
Phone1:
Phone2:
A record is then created for each store 28 that is included in the group file 402 in a Sender.Receive table which contains expected acknowledgment information, i.e., the name of the acknowledgment file that is expected for each store 28. The sender module 400 also contains a thread which monitors the acknowledgment directory for the acknowledgment files as they come back from the stores. Each file is matched up and the NMC database 252a and 252b is updated accordingly. Fields in the Sender.Receive Table are as follows:

Sender.Receive.Send_ID—specifies the related Sender.Send record identifier

Sender.Receive.Store_ID—specifies the related NMC.Person record identifier

Sender.Receive.ACK_Filename—specifies the expected prefix of the name of the acknowledgment file Sender.Receive.Received_Date—specifies the date on which the acknowledgment file was received.

Data fields in the Sender.Send Table are as follows:

Sender.Send.Send_Date—used to determine when the record is to be processed.

Sender.Send.Store_Set_Tablename—used to determine what table houses the IP addresses for each destination store. It is queried from the NMC.Person.Satellite_Address field for each destination store.

Sender.Send.Activation_Date—used to determine what day/time to transmit the distribution. This date is embedded into the distribution filename which the Maintenance module 550 uses to determine when to process the file in the store.

Sender.Package_Filename—used to get the name of the table which contains the list of addresses of the stores which are to receive the distributions.

Sender.Send.Group_Filename—specifies the path and name of the generated group filename (used by the Starburst software).

Sender.Send.Sent_Date—specifies when the distribution was sent.

Sender.Send.Completed_Date—specifies when the acknowledgments from all stores was received.

The executable name of the sender module 400 is sender.exe and has two modes of operation, Debug and Non-Debug, as well as dependent DLL's: Borland Database Engine 3.0 (ODBC support), ODBC 3.0 with Access ODBC Driver, wininet.dll (Microsoft). The sender module 400 is accessed by an interface including two output log windows (not shown). One of the output log windows displays messages from a sender thread that performs the sending function—transferring the distribution. The remaining window displays messages from the receive thread that performs the receiving function acknowledgments. Status and error messages will be displayed.

The operation mode is determined by a registry setting. In non-debug mode (non-interactive), as soon as Sender is launched, both the send and receive threads are started automatically and the output windows are minimized. In debug mode (interactive), a small screen with two buttons on it ('Start' and 'Stop') is provided and the user is required to press the 'Start' button to initiate the threads. In normal operation, the Sender Module 400 continuously runs on the NMC processor 32 server or when a known distribution task is pending (ie: an unprocessed record resides in the Sender.Send table). The Send thread performs the following functions:

Scans the Sender.Send table for records that have a Sender.Send.Send_Date that is equal to or before the current time and has a Sender.Send.Send_Date that is empty.

If one is found, it retrieves the store addresses from the Sender.Send.Store_Set_Tablename and builds the group file, first resolving the name to a qualified IP address. If an address cannot be qualified, the store will not be added to the group file and an error will be generated. If no valid Sender.Send records are found or if the addresses for all of the stores in a group cannot be resolved (DNS server down), the send thread is stopped and goes to sleep for the specified interval.

After the group file is built, the package file Sender.Send.Package_Filename is moved and renamed to the timestamped package filename format.

An FTP connection is then initiated using the information in the registry.

The group file and the distribution package are then transferred via FTP to the NOC.

For each store 28 that was added to the group file, a record is generated in the Sender.Receive table which contains the Send Identifier, Store Identifier, and the prefix of the expected Acknowledgment file that is to be received from the corresponding store. This prefix matches the Acknowledgment filename format.

The receive thread performs the following functions:

Scans the Registry."ACK Directory" directory for files that have names matching a record in the Sender.Receive table which has a corresponding prefix that matches the Sender.Receive.ACK_Filename field value.

If one is found, it removes the file from the acknowledgment directory and posts the current time to the Sender.Receive.Received_Date field. The corresponding store record in the NMC.Person table NMC.Person.Distribution_Set_Filename field is updated with the Sender.Send.Store_Set_Tablename field value signifying the Distribution Set that is currently in the store. The corresponding record in the Distribution.Distribution table for Distribution.Distibution.Pending field is updated to signify the distribution was completed successfully.

A query is performed to determine the number of remaining outstanding Receive records (that is, unreceived acknowledgment files from stores in the same Send event). If any are found and the interval between the current time and the Sender.Send.Sent_Date is greater than the specified interval in Registry."Delinquent Ack Interval (Hours)", an error is generated for each store. If none are found (that is, all acknowledgments have been received), the Sender.Receive table records with the same completed Sender.Receive.Send_ID field are removed and the Sender.Send.Completed_Date field is updated with the current time.

The registry associated with the sender module 400 is as follows:
Subkey: HKEY_LOCAL_MACHINE\SOFTWARE\PICS\Sender
Log Filename==Name of the log file to generate
Debug Mode==Debug mode flag (0=Non-Debug Mode, 1=Debug Mode)
Group Type==Value to use for 'group_type' entry in group file
Header==Header string to use for group file header
Address Type==String to use for 'address_type' entry in group file
Max Passes==String to use for 'max_passes' entry in group file
FTP Address==String to use for IP Address of the FTP server on the NOC server
FTP Login Name==String to use for FTP login name
FTP Password==String to use for FTP login password
FTP Directory==String to use for FTP upload directory
ACK Directory==String to use for directory where acknowledgment files are downloaded to
Sleep Interval==Number of milliseconds to wait between scans of the Sender.Send for the send thread and to scan for acknowledgment files in ACK download directory for the receive thread
Delinquent Ack Interval (Hours)==Number of hours to wait before a non-acknowledged transmission is reported as an error by the receive thread The reception module 450 comprises of computer code contained on the store server 26 that controls processing the compressed data 354, prepared by the builder module 350 and transmitted via the sender module 400. Specifically, the reception module 450 decompresses the compressed data 354 to retrieve one or more the distribution files 352 and deletes information no longer valid as designated by the distribution file. Valid information contained in the distribution files 352 are then moved to the appropriated site 30. Any errors that occur in the distribution of information to the sites 30 is indicated by to the maintenance module 550 and to the SNMP Agent Module 650 employing IP.

Specifically, the reception module 450 uncompress the .big files and distribute its contents to the appropriate places. The files associated with the reception module 450 are as follows:

[installSectionName]
extractFiles=cabFiles
deleteFiles=deleteFiles
[cabFiles]
LPData.cab=e:
audioEC.Cab=\\cd1\c
videoEC.cab=\\hv1\c
woe.cab=e:
[deleteFiles]
filename1.ext
filename2.ext
filename3.ext The registry settings of the reception module are as follows:
Under HKEY_LOCAL_MACHINE\SOFTWARE\PICS\BUILDER
Debug==Determines if the log window should be shown. 0=no log window. 1=log window.

In operation, the reception modules 450 is launched be executing the file rmod.exe with a one command line parameter. That parameter is the full path of the big file to extract. All errors will result in a SNMP trap. Critical errors, outlined below, will cause processing to stop. The following is the sequence of events that follows execution of rmod.exe file:

1) Files are extracted from the big file. On any error, a trap is generated and processing stops.
2) The big file is deleted.
3) The delete section of Setup.ini is parsed. Any error other than 'file not found' will cause processing to stop.
4) The extract section of Setup.ini is parsed.
 a) Each cab file is extracted to its destination location, as illustrated in the file section.
 b) Any error is critical, but processing will continue on a hopefully optimistic bases.

The site module 500 is computer code that is contained on both the store server 26 and in a memory associated with a site 30, e.g., memory 76. The site module 500 initiates the stimulus to be perceived by a consumer. As a result, the computer code present at a site 30 memory is dependent upon the devices associated therewith. For example, at a Kiosk 70, the site module 500 may include computer code to facilitate playback of MPEG-2 MPEG-1 videos arranged in a sequence according to the scripts specified in the distribution file 352. The videos may be displayed on a Kiosk 70 periodically, as discussed above, to obtain the attention of a consumer. Alternatively, the videos may by displayed in response to consumer interaction with the kiosk 70. a consumer may employ the light sensor 82 to scan product UPC codes.

Specifically, the site module 600 interprets script files, playing digital video and audio files (MPEG-1 and MPEG-2) and responding to consumer actions through network communication with an optionally attached Listening Post device.

The script file contains instructions that define the behavior and content of the Site module 500. The file is built at the NMC by the Builder Module and transmitted along with each new distribution. It defines which previewable UPC titles will be available, which advertising and attract videos are to played and in what order, as well as the behavior of the software to consumer commands from the Listening Post.

Content is either MPEG audio or video, text labels, or static graphics. Video files are either title previews, attract videos, or bumper videos. Static graphics are either full-screen bumper graphics, full-screen title background screens, or smaller graphics for various screen elements (bumper icons, arrow graphics, album covers, consumer error notifications). There are two modes of behavior, 'Attract' mode and 'Scan' mode. In attract mode, the video files defined in the script are played in order according to the attract portion of the script. In scan mode, the commands in the scanscript portion of the script are executed.

Consumer scans of titles and track/volume button presses are communicated from the Listening Post via IP. a TCP connection is established with device and track buttons are received and responded to during scan mode. Volume push buttons are always responded to as the volume is adjusted.

Script files associated with the site module 500 are as follows:

Script File—Playback behavior is driven by the script file. This file is read and parsed at startup. It is a text file in the Windows INI format It contains the following:

Script File Format

[VIDEO SECTION<UPC>]—This section contains a video definition. The section header is the UPC code. It contains the information necessary for a video to be played. Its keys are:
VF=filename; Name and path of the video's MPEG filename
LCD1=textString; Text for line 1 of the LCD panel when the video is played
LCD2=textString; Text for line 2 of the LCD panel when the video is played; these are used for optional text and graphic overlays—x is the index of each overlay
TOx=textString; Text used for overlay
TCx=Left;Top;Width;Height;; Screen coordinates in pixels for text box placement and size
TFx=fontName; Name of the font to use for drawing text
TRx=RRGGBB; Color value number in hex of color to use for drawing text ex: 0000FF
TZx=fontSize; Size in points of font to use for drawing text
GOx=filename; Name and path of a graphic overlay bitmap to be overlayed when video is played (x is the numberic count—there can be multiple overlays)
GCx=Left;Top;; Left and Top screen coordinate in which to place the corresponding x graphic; these are used for bumpers only
TG=filename; Graphic to display during transition screen between video playback and drill-down
IG=filename; Graphic to display as overlay on drill-down graphic (coordinate in settings section)
Example bumper video section with two text and two graphics overlays
[123456789012]
VF=c:\videos\video1.mpg
LCD1=Advertisers Name
LCD2=Product Name
TO1=Here's a text overlay string
TC1=100;100;50;200;
TF1=Arial
TR1=FFFFFF
TZ1=10
TO2=Here's a second text overlay string
TC2=50;10;300;10;
TF2=MS Sans Serif
TR2=FF00FF
TZ2=12
GO1=c:\graphics\v1_overlay1.bmp
GC1=10;10;
GO2=c:\graphics\v1_overlay2.bmp
GC2=500;750;
TG=c:\graphics\video1_trans.bmp
IG=c:\graphics\video1_icon.bmp
[AUDIO TRACK SECTION—<UPC_x>]—This section describes an audio track.
It's keys are:
AT=fileName; Name of MPEG audio track file to play
AN=trackName; Name of the audio track to display on drill-down screen
AL1=textString; String to display on line 1 of the LCD panel when track is played
AL2=textString; String to display on line 2 of the LCD panel when track is played
Example audio section definition
[123456789012_1]
AT=c:\audio\123456789012.mpg
AN=Stairway to Heaven
AL1=Led Zeppelin
AL2=Stairway to Heaven
[TITLE DEFINITION SECTION <Tx>]—This section describes a title. a title is a retail product which can be previewed at the Video Kiosk, has a video definition, and requires additional data including audio track information. This describes all the elements necessary for a title. Its keys are:
VS=upc; The video section definition for this title, is the same as the UPC code
ASx=audioSection; Section header string for audio track x
AB=filename; Name of the bitmap file to use for the drill-down function
CB=filename; Name of the bitmap file to use for the album cover overlay on a bumper video
LN=textString; Text string to use for liner notes overlayed on the drill-down screen Example title definition section
[T1]
VS=123456789012
AS1=123456789012_1
AS2=123456789012_2
AS3=123456789012_3
AB=c:\graphics\title1_drilldown.bmp
CB=c:\graphics\title1_cover.bmp
LN=This is the artist Led Zeppelin, from their very first album in late 60's
[TITLE SECTION <TITLES>]—This section contains a list of title definitions. Refers to all the titles that can be previewed in the script. Its keys are:
N=Tx=titleHeader; Header string of the title definition for this index. N and x refer to the ordinal number (starting from one) of the title.
Example title section with 4 titles
[TITLES]
1=T1
2=T2
3=T3
4=T4
[ATTRACT VIDEOS SECTION <ATTRACTS>]—This section contains a list of video definitions to be used as attract videos in the script Its keys are:
N=UPC; Header string of the title definition for this index. N refers to the ordinal number (starting from one) of the attract video.
Example attract section with 4 videos
[ATTRACTS]
1=857394853029
2=485773940291
3=239487759294
4=094762884766
[BUMPER VIDEO SECTION <BUMPERS>]—This section contains a list of video definitions to be used as bumper videos played prior to a title preview.
N=UPC|NULL; Header string of the title definition for this index. N refers to the ordinal number (starting from one) of the attract video. Contains either the UPC code of the bumper section or the empty string which specifies a blank entry and one which results in a bumper being skipped (not played).
Example attract section with 4 videos
[BUMPERS]
1=557394853029
2=675773940291
3=
4=453762884766
5=[BUMPER EXCLUSION DEFINITION <Bn>]—This section contains a bumper exclusion definition. This specifies any situation where a particular bumper video not be played prior to one or more title videos.
BV=Bumper Video Index; Index of the bumper video for exclusion
EVn=Title Video Index; Index of the title video to exclude where n is the ordinal index in the list of videos to exclude
Example Bumper Exclusion definition section
[B1]
BV=5
EV1=1
EV2=7
EV3=25
[BUMPER EXCLUSION SECTION <BUMPEREXCLUSION>]—This section contains a list of bumper exclusion definitions for use during the scan mode of the script.
N=BUMPER EXCLUSION SECTION; Section header to use as a bumper exclusion.
Example Bumper Exclusion section
[BUMPEREXCLUSION]
1=B1
2=B2
3=B3
4=B4
[LCD TEXT DEFINITION SECTION <Ln>]—This section contains a LCD text definition. This specifies an individual two-line text screen to be displayed on the LCD panel of the Listening Post device attached to the Site module 500 interpreting this script.
1=Line one text string; String for line one
2=Line two text string; String for line two
Example LCD Text Definition section
[L1]
1=Hello World
2=Welcome to DDS!
[LCD TEXT SECTION <LCDTEXT>]—This section contains a list of LCD text definition section headers to use for the LCD text elements of the script. These entries are individually scriptable in the same manner as videos.
N=LCD Text Definition section; Section header to use as a LCD text definition
Example LCD Text section
[LCDTEXT]
1=L1
2=L2
3=L3
4=L4
[ATTRACT SCRIPT SECTION <ATTRACTSCRIPT>]—This section contains a list of script commands which define which videos are played during 'attract' mode. The commands are interpreted one at a time and continue in a loop during the attract mode.
N=COMMAND;INDEX;SEQUENCE;INTERRUPTABLE; This is the format of one script command. 'COMMAND' is one of the following strings:
PA=Play Attract Video
PT=Play Title Video
PB=Play Bumper Video
PL=Play LCD Text String
PF=Play Audio Song Titles—'Drilldown Screen'
'INDEX' is the specific sequential index of the video or text element to play in the list of available videos. If this field is not blank, the 'SEQUENCE' field is ignored.
   'SEQUENCE' is either:
  S=Play Video or Text in Sequential Order. If there is no 'INDEX' specified, the next video in the list of available videos is played.
  R=Play Video or Text in Random Order. If there is no 'INDEX' specified, a random video is chosen from the list of available videos.
   'INTERRUPTABLE' is either:
  Y=Video Playback can be Interrupted by User Action (Scan or Track Button)
  N=Video Playback cannot be Interrupted by User Action (Scan or Track Button)
Example Attract Script
[ATTRACTSCRIPT]
1=PA;1;R;Y;
2=PL;;S;Y;
3=PT;;S;Y;
4=PA;;R;Y;
[SCAN SCRIPT SECTION <SCANSCRIPT>]—This section contains a list of script commands which define which videos are played during 'scan' mode—when a consumer initiates a product preview. The commands are interpreted one at a time are played one time for each product scan. The command format is the same as the attract script section. Note: the 'PT' command always refers to the product the consumer has scanned, hence any 'INDEX' or 'SEQUENCE' arguments are ignored.
Example scan script section
[SCANSCRIPT]
1=PL;;S;N;
2=PB;;S;N;
3=PT;;R;Y;
4=PF;;S;Y;
[DRILL-DOWN SETTINGS SECTION <SETTINGS>]—
This section contains all the necessary settings to perform the drill-down portion of a scan script.
COVER_BITMAP_X_ORIGIN=n; X coordinate, in pixels, of upper left corner where a title's cover bitmap will be placed during bumper video playback prior to the title's preview
COVER_BITMAP_Y_ORIGIN=n; Y coordinate, in pixels, of upper left corner where a title's cover bitmap will be placed during bumper video playback prior to the title's preview; next title prompt settings
NEXT_TITLE_STRING=titleString; String to use for prompting the consumer during bumper video playback of the title which about to be previewed.
NEX_TITLE_LEFT=n; X coordinate, in pixels, of upper left corner where the
NEXT_TITLE_STRING prompt will be displayed during bumper video playback prior to the title's preview
NEXT_TITLE_RIGHT=n; Y coordinate, in pixels, of upper left corner for the NEXT_TITLE_STRING
NEXT_TITLE_TOP=n; X coordinate, in pixels, of lower right corner for the NEXT_TITLE_STRING
NEXT_TITLE_BOTTOM=n; Y coordinate, in pixels, of lower right corner for the NEXT_TITLE_STRING
NEXT_TITLE_FONT=fontName; Name of the font to use for NEXT_TITLE_STRING
NEXT_TITLE_FONTCOLOR=RGB color value; RGB color value, in hexadecimal, of the font color to use for NEXT_TITLE_STRING
NEXT_TITLE_FONTSIZE=fontSize; Size, in points, of the font for NEXT_TITLE_FONTSIZE; audio title settings
AUDIO_TITLE_LEFT=n; X coordinate, in pixels, of upper left corner where a title's audio track names will be displayed over the audio drill-down screen
AUDIO_TITLE_TOP=n; Y coordinate, in pixels, of upper left corner where a title's audio track names will be displayed over the audio drill-down screen
AUDIO_TITLE_RIGHT=n; X coordinate, in pixels, of lower right corner where a title's audio track names will be displayed over the audio drill-down screen
AUDIO_TITLE_BOTTOM=n; Y coordinate, in pixels, of lower right corner where a title's audio track names will be displayed over the audio drill-down screen
AUDIO_TITLE_FONT=fontName; Name of the font to use when drawing a title's audio track names
AUDIO_TITLE_FONTCOLOR=RGB color value; RGB color value, in hexadecimal, of the font color to use when drawing a title's audio track names
AUDIO_TITLE_FONTSIZE=fontSize; Size, in points, of the font to use when drawing a title's audio track names
AUDIO_TITLE_HILITE_FONT=fontName; Name of the font to use when drawing a title's currently selected audio track name
AUDIO_TITLE_HILITE COLOR=RGB color value; RGB color value, in hexadecimal, of the background color to use when drawing a title's currently selected audio track name
AUDIO_TITLE_HILITE_FONTCOLOR=RGB color value; RGB color value, in hexadecimal, of the font color to use when drawing a title's currently selected audio track name
AUDIO_TITLE_HILITE_FONTSIZE=fontSize; Size, in points, of the font to use when drawing a title's currently selected audio track; miscellaneous settings MORE_SONGS_PROMPT_BITMAP=fileName; Name and path of the bitmap file to use for prompting the user for more songs after a title's preview and before the drill-down screen
MORE_SONGS_PROMPT_TIMEOUT=n; Number of seconds to display the MORE_SONGS_PROMPT graphic when there is no consumer action before ending scan mode
PREVIOUS_TRACK_ERROR_BITMAP=fileName; Name and path of the bitmap file to use when the consumer attempts to navigate beyond the beginning of a title's track list
PREVIOUS_TRACK_ERROR_X_ORIGIN=n; X coordinate, in pixels, of the upper left corner to use when drawing the PREVIOUS_TRACK_ERROR_BITMAP
PREVIOUS_TRACK_ERROR_Y_ORIGIN=n; Y coordinate, in pixels, of the upper left corner to use when drawing the PREVIOUS_TRACK_ERROR_BITMAP
NEXT_TRACK_ERROR_BITMAP=fileName; Name and path of the bitmap file to use when the consumer attempts to navigate beyond the end of a title's track list
NEXT_TRACK_ERROR_X_ORIGIN=n; X coordinate, in pixels, of the upper left corner to use when drawing the NEXT_TRACK_ERROR_BITMAP
NEXT_TRACK_ERROR_Y_ORIGIN=n; Y coordinate, in pixels, of the upper left corner to use when drawing the NEXT_TRACK_ERROR_BITMAP
NEXT_TRACK_PROMPT_BITMAP=fileName; Name and path of the bitmap file to use for displaying the next track graphic prompting the user to press the 'Next' button on the Listening Post device
NEXT_TRACK_PROMPT_X ORIGIN=n; X coordinate, in pixels, of the upper left corner to use when drawing the NEXT_TRACK_PROMPT_BITMAP
NEXT_TRACK_PROMPT_Y_ORIGIN=n; Y coordinate, in pixels, of the upper left corner to use when drawing the NEXT_TRACK_PROMPT_BITMAP
AUDIO_ONLY_BITMAP=fileName; Name and path of the full-screen bitmap file to display when a non-featured title is begin previewed by the Listening Post attached to the Video Kiosk
PAUSE_BITMAP=fileName; Name and path of the full-screen bitmap to display when the Video Kiosk is paused by the Maintenance module 550 for an update
UNKNOWN_SCAN_BITMAP=fileName; Name and path of the full-screen bitmap file to display an unrecognizable scan message comes from the Listening Post device attached to the Video Kiosk
LINER_NOTES_FONT=fontName;
LINER_NOTES_FONTCOLOR=RGB color value; RGB color value, in hexadecimal, of the background color to use when drawing a title's currently selected audio track name
LINER_NOTES_FONTSIZE=fontSize; Size, in points, of the font to use when drawing a title's liner notes
LINER_NOTES_LEFT=n; X coordinate, in pixels, of upper left corner where a title's liner notes will be displayed over the audio drill-down screen
LINER_NOTES_TOP=n; Y coordinate, in pixels, of upper left corner where a title's liner notes will be displayed over the audio drill-down screen LINER_NOTES_RIGHT=n; X coordinate, in pixels, of lower right corner where a title's liner notes will be displayed over the audio drill-down screen
LINER_NOTES_BOTTOM=n; Y coordinate, in pixels, of lower right corner where a title's liner notes will be displayed over the audio drill-down screen
BUMPER_ICON_X_ORIGIN=n; X coordinate, in pixels, of upper left corner where a bumper video's icon will be displayed over the audio drill-down screen
BUMPER_ICON_Y_ORIGIN=n; Y coordinate, in pixels, of upper left corner where a bumper video's icon will be displayed over the audio drill-down screen
BUMPERETTE_TIMEOUT=n; Amount of seconds to display a bumper video's full-screen transition graphic (or bumperette) after a title's preview and before the drill-down screen
TODO: Log File
Network
The Site module 500 performs communication over the TCP/IP network in the following manner:

| Communication Task | Method |
|---|---|
| Receive consumer actions: product UPC scans, track buttons, volume buttons. | TCP protocol. Uses port and Listening Post address file information stored in the registry to locate the IP address of appropriate Listening Posts, initiate and establish a connection, and send/receive messages to implement task. Strings used for communication (all strings terminated with a carriage-return character):<br>UUpcCode; Consumer Product Scan, ex: U123456789012<br>B[<,>,+,-]; Consumer button press ('<' = previous track button, '>' = next track button, '+' = volume up button, '-' = volume down button, ex: B +<br>L[1,2]TextString; LCD text string for line one or two for LP to display, ex: L1Hello World!<br>U000000000000; Special UPC code for non-featured product titles<br>U111111111111; Special UPC code for attract-mode |
| Receive 'PING' requests from Maintenance module 550 | UDP protocol. Uses port information stored in the registry to listen on a UDP socket and respond to the following message:<br>PING; a ping request from the Maintenance module 550<br>To acknowledge a ping, the following message is replied:<br>ACK; a ping acknowledgment |
| Generating SNMP errors | All critical-level errors generate a message which is sent to the SNMP Agent module via UDP messages. See the SNMP Agent Module 650 for details. |

All Listening Post device IP addresses are acquired from the Listening Post address file created and maintained by the Listening Post Server software. The name and location of this file as well as the section headers and entry keys are stored in the registry.
Registry
Subkey: HKEY_LOCAL_MACHINE\SOFTWARE\PICS\Video]
Debug Mode==Debug Mode flag (0=false, 1=true)
Key Color==4 byte RGB color value for MPEG decoder's transparent key color
Log Filename==Name and path of log file
MCI Open String==String to use when opening MCI device (decoder card dependent)
Overlay Capable==Flag to specify use of transparent overlays (0=no, 1=yes)
Scanner Port==Socket port number for Listening Post Scanner device communication
Scanner Reconnect Timeout==Amount of time, in milliseconds, to retry failed connection requests to the Listening Post device
Script Filename==Name and path of the script to execute
Uses Scanner==Flag to specify whether to establish communication with a Listening Post device (0=no, 1=yes)
Video Height==Height of the video output window in pixels
Video Left==Upper left X coordinate of video output window in pixels
Video Top==Upper left Y coordinate of video output window in pixels
Video Width==Width of the video output window in pixels
Ping Port==Socket port number to wait for 'ping' requests from server
Minimum Track Delay==Minimum amount of delay, in seconds, to wait between responses to track buttons
Use Track Buttons==Flag to specify whether track button press messages are responded to (0=no, 1=yes)
Scanner Address Filename==Name and path of scanner address file where Listening Post address file is stored
Scanner Address File Section==String used for section header where Listening Posts address entries are contained
Scanner Address File Key==String to use for address key in the address file
Volume Step==Amount of increment for volume presses
User Interface
  The main interface for the Video Kiosk is the video output window (contains the decoded video) and the overlay window (contains any text and/or graphics overlays, if appropriate) which sits directly above the video output window. The size and position of these windows as well as the color value used by the MPEG decoder board for transparent overlays are defined in the registry. When the Site module 500 is in debug-mode (defined by registry setting), a resizable text output window is displayed over the video output window which contains all text status and error messages that are sent to the log file during non debug-mode.
Detail
Executable Name: endcap.exe
Dependent DLL's: winsck.ocx (Netmanage TCP OLE control version 1.0—Licensed)
  The Site module 500 interacts with the consumer through the attached Listening Post (LP) device. The Site module 500 performs the following tasks:
Startup
  Communicates with the MPEG decoder using MCI commands
  The registry entries are retrieved and the script file is opened and parsed into memory. The script file is then closed.
  The output window(s) are prepared and the MPEG decoder device is opened.
  The 'Attract' mode is started.

A separate thread is started to initiate the TCP connection to the LP.

This continues until a connection is established and when an existing connection is lost. When the connection is established, consumer actions at the LP will be processed.

'Attract' Mode

Occurs when the consumer is not interacting with the LP.

ATTRACTSCRIPT section of script file is read and script commands are interpreted and continue looping until a customer action occurs. The script is reset whenever the Attract Mode is restarted.

'Scan' Mode

Occurs when the consumer performs a product UPC scan using LP.

The LP sends the UPC scan code to the Video Kiosk if the UPC is contained in the 'Featured List'. Note: The 'Featured List' is a file which is read by the LP and is stored on the in-store server which contains all the UPC codes which are valid for the Video Kiosk to process. This file is created by the Builder Module and matches the UPC codes which are put in the TITLES section of script. The LP is responsible for searching this list after each UPC scan and to transmit only UPC codes which are in the 'Featured List' (in addition to the three 'special' UPC codes which are interpreted differently— see the 'Network' section).

SCANSCRIPT section of script file is read and script commands are interpreted.

'Drill-Down' Mode

Occurs during Scan Mode and is triggered in the script with a 'PF' (Play Audio Files command).

Begins by displaying a full-screen 'transition' graphic associated with the Bumper video which preceded the title preview according to the most recent 'PB' (Play Bumper) command. The graphic is displayed for an interval specified in the script (see 'Settings' section of the script file). If no bumper was played (because of a NULL bumper entry), no graphic is displayed.

After the transition graphic is (optionally) displayed, the full-screen audio background for the title being previewed is displayed, the audio track titles are displayed, the liner notes are displayed, the first track name is highlighted, and the arrow graphic is displayed (position, font, and color information for all these elements are read from the script—see 'Settings' section of script file).

The first audio track is then played and the consumer can then navigate the tracks by using the LP navigation keys. The consumer can also adjust the volume accordingly. When the consumer presses the 'Previous Track' button when the current track is the first available track or presses the 'Next Track' button when the current track is the last available track, an error graphic is displayed.

When playback of the final track is finished, the 'Attract Mode' is reset and begins.

'Passive' Mode

Occurs when the consumer scans a product not available for video preview but available for audio-only preview. The LP performs in stand-alone mode elsewhere in the DDS network (see ARMA documentation), whereas products can be scanned and their audio-only previews are played back through a set of attached headphones. The LP, in this mode, performs all consumer response functions. In order to preserve this behavior for LP devices attached to the Video Kiosk, the 'Passive' Mode is provided.

In this mode the LP, when a product is scanned, performs a lookup in the 'featured list' for the product's UPC. If it is found in this list, it is sent to the Video Kiosk via the TCP connection. If the UPC code is not found, the LP then performs its normal logic in that it attempts to locate the audio files on the server for that product (see ARMA documentation for more details). If the files are located, the LP sends a special UPC code (00000000000) to the Video Kiosk informing it that a non-featured product is about to be displayed. The Video Kiosk, in response to this message, stops any current playback and displays a full-screen static graphic (specified in the script) informing the user of the situation. The decoded audio from the LP is then sent to the Video Kiosk through its audio input which is then sent to the attached speakers. All subsequent volume control by the consumer is communicated to the Video Kiosk where it manages the mixer volume on its audio card. When the consumer has finished previewing the non-featured title, the LP sends another special UPC code to the Video Kiosk (111111111111) informing it to reset and resume the Attract Mode.

Additionally, when a scanned UPC code cannot be determined by the LP (not in the featured list and not available on the server), it sends a special UPC code (999999999999) informing the Video Kiosk that an unknown product scan has occurred. The Video Kiosk, in response to the message, displays a full-screen graphic (defined in the script) informing the user of the situation. This graphic is displayed for an interval defined in the script. At the end of this interval, the Attract Mode is reset and resumed.

Acknowledgment File

This file is created in the store by the Maintenance module 550. It contains a 1 character blank ad has information within the name which is use by the Sender Module to process acknowledgments.

Acknowledgment filename format:

StoreName_ActivateDate_SendID.ReturnCode were:

StoreName=Hostname of the store (non-resolved machine name)

ActivateDate=Date distribution was distributed and hence activated

SendID=Corresponding Send table record identifier: Sender.Send.Send_ID

ReturnCode=Code returned by Reception Module upon completion of its process, one of the following:

0: no errors occurred

1: non-critical error occurred (process still completed)

2: critical error occurred (process did not complete)

Example:

DDS-SERV-00001_07-01-1997_99.0

Log File

The maintenance module 550 launches the reception module 500 upon detection of a distribution file 352, and return code is employed to create an acknowledgment file which is sent via FTP to the NMC processor 32. The maintenance module 550 also a periodic batch process to collect consumer usage statistics on the kiosks 70 and other interactive devices on the store network, querying for and gathering system information from the kiosks 70, detection of newly acquired compressed data 354, and launching of the reception module 450, discussed above, when a newly acquired compressed file 354 is present at the server 26. This entails sending network IP messages to the proxy module 600 to initiate shutdown of all the site 30 processes. To that end, the proxy module 600 is computer code store on the various sites 30 which terminate site 30 processed upon receive the IP message from the message module 550. The proxy module 600 also indicates to a consumer at the site 30 that the same is unavailable during this time, e.g., by displaying a graphic on a monitor. Once these site 30 process are suspended, the appropriate log and statistics data is collected, compressed, and sent via FTP to the NMC processor 32. When the maintenance module 550 is completed, it sends an additional IP message to the proxy module 600 informing it to restart the site 30 processes.

Specifically, the maintenance module 550 runs by the Windows NT task scheduler service typically around midnight. The Maintenance module 550 is responsible for determining if each instance of the Site module 500 is functioning as well as if the Listening Post devices are alive. Information about the state of each computer running the Site module 500 is obtained and collected. All statistics files generated by the Listening Post Software is gathered and collected. This information is then transmitted to the NMC server computer.

New distributions are also detected and the Reception Module is launched and its error code returned in the generated acknowledgment file transmitted to NMC server computer.

The maintenance module 550 has the following files associated therewith (default names in parens):

Maintenance Module Log File (serverlog.log)—The log file created during maintenance function. All status and error messages that occur during processing, but before transfer, are logged to this file. This file is collected and sent back the NMC as part of the maintenance function.

Video Kiosk Log File(s) (videolog.log)—The log files generated by the Video Kiosk(s). These are collected during the maintenance function.

Listening Post Device Log File(s) (cd*.log, hv*.log, lp*.log)—The log and statistics files for the Listening Post devices and the Listening Post server software. These are collected during the maintenance function.

Compressed Log Collection File (.zip)—This is a single compressed file which contains all of the log and statistics files to be sent to the NMC. The logs are divided by a directory structure that is stored along with the files themselves.

| Directory | Files |
|---|---|
| PICSLOG\ec.x\*.log | Log files for a Listening Post device connected to a CD Kiosk Kiosk |
| PICSLOG\hv.*\*.log | Log files for a Listening Post device connected to a Home Video Kiosk |
| PICSLOG\lp.*\*.log | Log files for a stand-alone Listening Post device |
| PICSLOG\ServerLog\serverlog.log | Log file for a Listening Post device connected to a CD kiosk |
| PICSLOG\cdx\videolog.log | Log file generated by the CD Kiosk |
| PICSLOG\hvx\videolog.log | Log file generated by the Home Video Kiosk |

Each log file sent to the NMC has a filename that is timestamped and contains store origination.
Log filename format
PICSLOG_StoreAddress_'Sent Date(mm-dd-yyyy)'.zip
Example
    PICSLOG_10.20.30.40_10-10-1997.zip
    TODO: Log File
Distribution Acknowledgment File—The file that is generated and sent to the NMC server computer where it will be ultimately received by the Sender Module as an acknowledgment of a successful distribution. See the Sender Module section for the file format.

Network

The Maintenance module 550 performs communication over the TCP/IP network over the network in the following manner:

| Communication Task | Method |
|---|---|
| 'Ping' the Video Kiosk Computer(s) to determine if Site module 500 is functioning | TCP protocol. Uses port and address information stored in the registry to initiate a connection and verify Site module 500 is operating. |
| Send PAUSE/START messages to all Listening Posts and Site module 500s for file updates | UDP protocol. Uses port and address information stored in the registry and addresses retrieved from the Listening Post address file maintained by the Listening Post software to send the messages.<br>Strings used for Listening Posts:<br>PAUSE_COMMAND = "Wait"<br>PLAY_COMMAND = "Start"<br>SHUTDOWN_COMMAND = "Reboot"<br>Strings used for Site module 500s:<br>PAUSE_COMMAND = "PAUSE"<br>PLAY_COMMAND = "PLAY"<br>SHUTDOWN_COMMAND = "SHUTDOWN" |
| Retrieving remote log files | Windows networking protocol. Uses share and file name information stored in the registry to attach to the shares and retrieve the files |
| Generating SNMP errors | All critical-level errors generate a message which is sent to the SNMP Agent module via UDP messages. See the SNMP Agent Module 650 for details. |

User Interface

In debug-mode, all output is sent to a text window on the machine's desktop, in non debug-mode output is sent the log file and the output window is not visible. All critical errors are reported to the output and the SNMP Agent Module 650.

Registry

Subkey: HKEY_LOCAL_MACHINE\SOFTWARE\PICS\Maintenance

Endcap Count=Number of Video Kiosk instances
Endcap Port==Socket port number for Listening Post device connected to Site module 500s
Ping Port==Socket port number for communication with the Video Kiosks during test pings
Ping Timeout==Amount of time in milliseconds to wait for ping response from Video Kiosks
Log Filename==String to use for name and path of log file to generate during processing
Endcap1==String to use for name of computer running $1^{st}$ instance of Video Kiosk (CD Endcap)
Endcap2==String to use for name of computer running 2nd instance of Video Kiosk (Home Video)
Debug Mode==Debug mode flag (0=false, 1=true)
Endcap Log Filename==Name of log file to collect from Video Kiosks
Temp Directory==Path to use for temporary directory
Endcap Log Sharename==Name of drive share on Video Kiosk computers to copy logs from
LP Log File Extension==File extension used by Listening Post log files
LP Root Directory==Drive and path of directory where root ARMA files are stored Low Disk Space Threshold %==Number in percent where an error will generated if available space Falls below Log FTP Address==Host address of NMC server computer for FTP transfer of logs/statistics Log FTP Username==Login name for NMC's FTP server Log FTP Password==Password for FTP session Log FTP Directory==FTP Directory on NMC Download Directory==Directory to watch for distribution downloads Reception Module==Name and Path of the Reception Module executable LP Address Filename==Name and Path of the Listening Post address file (terms.ini)

LP Address Section Header Prefix==String to use for address section header prefix in the address Tile LP Address Key==String to use for address key in the address file LP Port==Socket port number of Listening Post device(s) for communicating the 'start' and 'stop' IP messages Ack FTP Address==String to use for host address of NMC server computer for sending of acknowledgments Ack FTP Directory==String to use for the directory on the NMC that is to receive acknowledgments Ack FTP Password==Login name for FTP acknowledgment session Ack FTP Username==Password for FTP acknowledgment session Detail Executable Name: server.exe Dependent DLL's: xcdzip32.dll (Xceed ZIP Library 2.0—Licensed), xcdunz32.dll (Xceed ZIP Library 2.0—Licensed), winsck.ocx (Netmanage TCP OLE control version 1.0—Licensed)

During normal operations, the Maintenance module 550 performs the following tasks:

'Ping' each instance of the Site module 500 on the network. Locates from the registry the addresses of the remote Video Kiosk computers and initiates a TCP network connection. A connection request is sent for up to Registry.Ping Timeout seconds where after no connection is made, an error is generated. If a successful connection is made, it is noted in the output.

Send PAUSE signal to each Listening Post device. This entails retrieving the IP addresses for each device from the Listening Post address file (Registry.LP Address Filename) by searching the file for the sections (Registry.IP Address Section Header Prefix+DeviceNumber) and the entries (Registry.LP Address Key) which contain the addresses. If the file cannot be located or the entry is not found, an error will be generated. For each device entry found, the pause event string is sent (see Files section) on port Registry.Ping Port.

Send PAUSE signal to Site module 500s. This entails using the Registry. 'Endcap Count' and Registry. "Endcapx" (where x is 2–Endcap Count) entries to get the address of each Video Kiosk instance and send a pause event string on port Registry.Ping Port. Also sends the string to the local Site module 500. Stop the Listening Post Server boot and log processes. Unloads the Listening Post server processes so files will be not locked. Uses the Registry for their names. Gather All Log files. This entails locating, gathering and moving of all the log files generated by the system. Creates storage in the temporary directory specified in the registry to hold the files before compression to .zip format. For each instance of the Video Kiosk Log files, it uses the registry for computer name, share names, and file names. For each Listening Post device and Listening Post server software, it uses the registry to locate the files, which are stored locally.

Collect available disk space information. Checks and reports the Video Kiosk computer's available disk space from the published drive shares. Also checks and reports the amount of disk space available to the local disk drives. If the percentage available on any one falls below the threshold set in the registry, an error is generated to the output and the SNMP Agent.

Compresses Log Data. Compresses the log data into one file using the zip format. Transmit the Log Data. The file is renamed to contain address and timestamp information. An FTP session is initiated to the NMC server computer. If a connection is refused, the system will generate a random number between 1–30 and sleep for that many seconds and retry. If after 15 tries the system cannot be contacted, the operation is aborted.

Scan the Download Directory for new distributions. Checks in the directory specified in the registry for BIG files—if the timestamp in the prefix of the filename matches or is prior to the current time, the Reception Module is launched and the file is passed as an argument. Operation of the Maintenance module 550 is suspended until the Reception Module has finished processing the file and a return code has been received. When a return code is received, the acknowledgment file is created. PICS_SETUP.EXE—When this file is found, the file will be executed as an application and the Maintenance module 550 will close.

Transmit the acknowledgment file (if a distribution has been successfully complete). This entails initiating an FTP session to the NMC server computer. If a connection is refused, the system will generate a random number between 1–30 and sleep for that many seconds and retry. If after 15 tries the system cannot be contacted, the operation is aborted.

Send START signal to all systems. Sends START event signal to all modules that were previously PAUSE'd.

The Proxy module 600 serves as a front-end for the Site module 500. Its responsibility is two-fold. First, it serves as the communication layer between the Site module 500 and the Maintenance module 550 for distribution updates. Second, it is responsible for starting and stopping the Site module 500 process during updates in order to insure that files that may potentially be updated or removed during the process are not locked. In this manner, the Proxy module 600 is always used to start the Site module 500 as it keeps track of its process handle in order to be able to terminate it accordingly.

Additionally, the Proxy module 600 performs the task of displaying a static graphic to the consumer while the Site module 500 is terminated during a distribution update informing them of the situation. The Proxy module 600 reads information from the [SETTINGS] section of the script file, refer to the Site module 500's 'Files' section for information on this file. The following elements of the [SETTINGS] section that are used are:

[SETTINGS]

PAUSE_BITMAP=fileName; Name and path of the full-screen bitmap to display when the Video Kiosk is paused by the Maintenance module 550 for an update The Proxy Kiosk Module performs communication over the TCP/IP network in the following manner:

| Communication Task | Method |
| --- | --- |
| Receive PAUSE/START messages from Maintenance module 550 during update process | UDP protocol. Uses port information stored in the registry to create a socket to listen for PAUSE/START messages. Strings responded to by Proxy module 600:<br>PAUSE_COMMAND = "PAUSE"<br>PLAY_COMMAND = "PLAY"<br>SHUTDOWN_COMMAND = "SHUTDOWN" |

Registry
Subkey: [HKEY_LOCAL_MACHINE\SOFTWARE\PICS\Video]
Server Port==Socket port number to use for START/STOP messages
Video Application==Path and name of Video Kiosk executable
Script Filename==Name and path of the script to execute
Video Height==Height of the video output window in pixels
Video Left==Upper left X coordinate of video output window in pixels
Video Top==Upper left Y coordinate of video output window in pixels
Video Width==Width of the video output window in pixels
User Interface
The Proxy module 600 creates an output window which is the same size and position as the Site module 500's video output and overlay windows. This window is used to display the pause graphic during updates. If a pause graphic is not available, a text message 'System Unavailable' is displayed in centered white text against a black background.
 Command-Line Interface
The Proxy module 600 is executed by running the proxy.exe file and has the following dependent DLL's: winsck.ocx (Netmanage TCP/UDP OLE control version 1.0— Licensed). The Proxy module 600 accepts one optional command line argument:
 -n: Where n is the number of seconds (between 0 and 9) to wait before starting the Site module 500. This is for some situations where the Proxy module 600 is started automatically from the 'Startup' group.
Invoking the proxy module performs the following functionsnvokiperforms the following actions:
 Startup
  Retrieves registry settings to find the script file, the output window coordinates, the socket port to listen for server commands, and the path to the Site module 500 executable.
  The script file is opened and the pause graphic filename is retrieved. The script file is then closed. The pause graphic is loaded into memory and the Site module 500 executable is started (after the optional number of seconds specified at the command-line).
  The UDP socket port is opened.
 PAUSE Message Received From Maintenance module 550
  The Site module 500 process is closed.
  The output window is brought to focus.
 START Message Received From Maintenance module 550
  The Site module 500 process is started.

The SNMP agent module comprises of computer code to gather various critical errors reported by the reception module 450, the site module 500, the maintenance module 550, and the proxy module 600 to create SNMP error-trap conditions which will be reported to any local or remote SNMP manager which is listening for these traps. The SNMP manager resides in the NMC 12. This entails listening for IP messages which contain information about the error including the location and level of criticality. Once an error is received, an appropriate SNMP error trap. This software resides on the in-store server and accepts IP error messages from any device on the in-store network.

Specifically, the SNMP has the following registry associated with it:
Subkey:
[HKEY_LOCAL_MACHINE\SOFTWARE\PICS\SNMP\CurrentVersion]
Pathname==Path of directory where dll is located
Host==Hostname of computer running SNMP Agent
Port==Socket port number used to listen for error messages The foregoing description of preferred embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

What is claimed is:

1. A method of disseminating information over a private network concerning a product, both of which are to be perceived by a consumer, said method comprising:

providing one or more databases that receive content providers' files, said databases including digitized and cataloged product information and at least one of sponsor information and attract videos;

creating designated files for distribution to one or more end clients by combining into a single file said content providers' files, including said digitized and cataloged product information and said at least one of sponsor information and attract videos, and at least one attribute assigned for each content provider file;

transmitting said designated files to said end clients remotely disposed with respect to said one or more databases, wherein each end client receives only its designated files;

providing a perceivable stimulus, from said designated files to said consumer, said perceivable stimulus being associated with said product; and wherein an interactive consumer stimulus initiated by the consumer includes said perceivable stimulus.

2. The method as recited in claim 1 wherein the perceivable stimulus is repeated multiple times and create statistical data.

3. The method as recited in claim 2 further including conveying said statistical data to said database.

4. The method as recited in claim 1 wherein transmitting includes forming, from a subportion of said designated files, a distribution database having content data, with said content data being defined by said perceivable stimulus.

5. The method as recited in claim 4 wherein said distribution database includes a distribution file and further including compressing and distributing said distribution file to at least one of said end clients via satellite.

6. The method as recited in claim 1 wherein said perceivable stimulus is dependent upon criteria of an ambient proximate to said product.

7. The method as recited in claim 1 wherein said perceivable stimulus is selected from the set consisting of auditory, visual, olfactory and tactile.

8. The method as recited in claim 1 wherein said interactive consumer stimulus is initiated by a consumer scanning a UPC code on said product.

9. A method of disseminating information over a private network concerning multiple products, said method comprising:

receiving content providers' files, the content providers' files including digitized and cataloged product information and at least one of sponsor information and attract videos;

assigning at least one attribute for each content provider file and creating designated files for distribution to end clients by combining into a single file the content providers' files, including said digitized and cataloged product information and said at least one of sponsor information and attract videos, and said at least one attribute for each content provider file;

creating a database containing said designated files;

selecting a plurality of end clients;

transmitting said designated files to said selected end clients with each of said selected end clients receiving only its designated files, wherein said selected end clients are remotely disposed with respect to said database, with subsets of said selected end clients corresponding to differing products, including transmitting information corresponding to a first of said multiple products to a first subset of said end clients;

providing a perceivable stimulus, from said information corresponding to said first of said products, to a consumer positioned proximate to said one of said end clients, with said perceivable stimulus being associated with said first of said multiple products; and wherein an interactive consumer stimulus initiated by said consumer includes said perceivable stimulus.

10. The method as recited in claim 9 wherein said providing step is repeated multiple times and statistical data are defined based at least partly on providing the perceivable stimulus.

11. The method as recited in claim 9 wherein creating further includes accumulating content associated with a subgroup of said multiple products and associating said content with parameters, said parameters including group definitions and date ranges.

12. The method as recited in claim 11 wherein transmitting includes forming a distribution database having a plurality of records, said plurality of records including a subportion of said content and corresponding to a server address, with a subpart of said plurality of end clients being associated with said server address.

13. The method as recited in claim 12 wherein transmitting further includes creating from a subset of said plurality of records a distribution file, wherein the distribution file is compressed and distributed via satellite.

14. The method as recited in claim 13 wherein said interactive consumer stimulus is initiated by a consumer scanning a UPC code on said product.

15. The method as recited in claim 9 wherein said perceivable stimulus is dependent upon criteria of an ambient proximate to said product.

* * * * *

UNITED STATES PATENT AND TRADEMARK OFFICE
Certificate

Patent No. 6,591,247 B2  Patented: July 8, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael R. Stern, Mill Valley, CA (US); William L. Mince, Menlo Park, CA (US); and Daniel E. Kyte, San Francisco, CA (US).

Signed and Sealed this Twenty-seventh Day of October 2009.

KAMBIZ ABDI
*Supervisory Patent Examiner*
Art Unit 3692